US012771615B2

(12) United States Patent
Majjiga et al.

(10) Patent No.: US 12,771,615 B2
(45) Date of Patent: Oct. 20, 2026

(54) SYSTEMS AND METHODS FOR GRANULAR DISTRIBUTED NETWORK FUNCTION CONFIGURATION UPDATES IN A WIRELESS NETWORK

(71) Applicant: Verizon Patent and Licensing Inc., Basking Ridge, NJ (US)

(72) Inventors: Deepak Majjiga, Irving, TX (US); Jason T. Wright, Novi, MI (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 30 days.

(21) Appl. No.: 18/888,924

(22) Filed: Sep. 18, 2024

(65) Prior Publication Data

US 2025/0379793 A1 Dec. 11, 2025

Related U.S. Application Data

(63) Continuation-in-part of application No. 18/735,460, filed on Jun. 6, 2024.

(51) Int. Cl.
*H04L 41/12* (2022.01)
*H04L 41/082* (2022.01)

(52) U.S. Cl.
CPC ............ *H04L 41/12* (2013.01); *H04L 41/082* (2013.01)

(58) Field of Classification Search
CPC .............................. H04L 41/12; H04L 41/082
See application file for complete search history.

(56) References Cited

U.S. PATENT DOCUMENTS 9,705,978 B1 * 7/2017 Kenigsberg ........... H04L 67/101
11,509,694 B1 * 11/2022 Aloisio ............... H04L 63/0209
2011/0029965 A1 2/2011 Lamba
2020/0120559 A1 * 4/2020 Centonza ............ H04W 88/085
2021/0111955 A1 4/2021 Meyer
(Continued)

FOREIGN PATENT DOCUMENTS

CN 115189897 B * 8/2025 ........... G06F 16/957

OTHER PUBLICATIONS

H. Li, D. Xu, Z. Xu and X. Li, “Hybrid Parameter Update: Alleviating Imbalance Impacts for Distributed Deep Learning,” 2022 IEEE 24th Int Conf on High Performance Computing & Communications; 20th Int Conf on Smart City; 8th Int Conf on Dependability in Sensor, CI (Year: 2022).*
(Continued)

*Primary Examiner* — Messeret F Gebre

(57) ABSTRACT

A system described herein may identify a plurality of configurable parameters associated with Network Functions (“NFs”) of a wireless network; identify a link between a first parameter, associated with a first NF of the plurality of NFs, and a second parameter associated with a second NF of the plurality of NFs; indicate, to first NF and/or the second NF, the link between the first parameter and the second parameter; and output a configuration update to the first NF, where the configuration update includes a particular value for the first parameter associated with the first NF. The second NF may receive an indication of the configuration update and modify, based on receiving the indication of the configuration update and further based on the link between the first parameter and the second parameter, the second parameter based on the particular value.

20 Claims, 26 Drawing Sheets

(56) References Cited

U.S. PATENT DOCUMENTS

| | | | |
|---|---|---|---|
| 2023/0016602 | A1 | 1/2023 | Vuggrala |
| 2024/0196304 | A1 | 6/2024 | Visa |
| 2024/0349156 | A1 | 10/2024 | Alasti |

OTHER PUBLICATIONS

M.-H. Tsai, C.-C. Chuang, S.-F. Chou, A.-C. Pang and G.-Y. Chen, "Enabling Efficient and Consistent Network Update in Wireless Data Centers," in IEEE Transactions on Network and Service Management, vol. 16, No. 2, pp. 505-520, Jun. 2019 (Year: 2019).*

* cited by examiner

201

| DU ID | DU group(s) |
| --- | --- |
| DU_A | Group_A |
| DU_B | Group_A, Group_D |
| DU_C | Group_A, Group_E |
| DU_D | Group_A |
| DU_E | Group_A, Group_E |
| DU_F | Group_B |

FIG. 2

301

| DU Group | DU ID(s) |
| --- | --- |
| Group_A | DU_A, DU_B, DU_C, DU_D, DU_E |
| Group_B | DU_F, DU_G, DU_H, DU_I |
| Group_C | DU_J, DU_K, DU_L, DU_M, DU_N, DU_O |
| Group_D | DU_B, DU_G, DU_J |
| Group_E | DU_C, DU_E, DU_H |

FIG. 3

| | |
|---|---|
| Path_A | DU_A, DU_D, DU_E |
| Path_B | DU_A, DU_C, DU_B, DU_E |
| Path_C | DU_A, DU_C, DU_D |

SYSTEMS AND METHODS FOR GRANULAR DISTRIBUTED NETWORK FUNCTION CONFIGURATION UPDATES IN A WIRELESS NETWORK

CROSS-REFERENCE TO RELATED APPLICATION

This Application is a Continuation-in-Part of U.S. patent application Ser. No. 18/735,460 filed on Jun. 6, 2024, titled "SYSTEMS AND METHODS FOR DISTRIBUTED NETWORK FUNCTION CONFIGURATION UPDATES IN A WIRELESS NETWORK," the contents of which are herein incorporated by reference in their entirety.

BACKGROUND

Wireless networks provide wireless connectivity to User Equipment ("UEs"), such as mobile telephones, tablets, Internet of Things ("IoT") devices, Machine-to-Machine ("M2M") devices, or the like. Wireless networks may include a variety of network functions ("NFs") that each perform particular operations that facilitate the providing of wireless connectivity. For example, one type of NF (e.g., an Access and Mobility Management Function ("AMF") or a Mobility Management Entity ("MME")) may perform access and/or mobility-related operations, another type of NF (e.g., a Distributed Unit ("DU")) may perform baseband processing of wireless traffic sent to or received from a UE via a radio access network ("RAN") of the wireless network, and so on. A wireless network operator may configure the DUs for purposes such as Quality of Service ("QoS") management, routing, load balancing, etc.

BRIEF DESCRIPTION OF THE DRAWINGS

FIGS. 1-6 illustrate an example of assigning configuration routing paths for NFs of a wireless network, in accordance with one or more embodiments described herein;

DETAILED DESCRIPTION OF EXAMPLE EMBODIMENTS

The following detailed description refers to the accompanying drawings. The same reference numbers in different drawings may identify the same or similar elements.

Embodiments described herein provide for the configuration of multiple (e.g., dozens, hundreds, or more) NFs, or NF instances, in a wireless network in a distributed manner. As discussed herein, the distributed (e.g., decentralized) configuration of NFs in the wireless network may avoid situations where a centralized system is responsible for propagating configuration updates to the NFS, thus providing a more robust framework for propagating configuration updates (e.g., eliminating a single point of failure). As provided for herein, NFs may also maintain policy-based configuration updates and apply such updates at a later time (e.g., when conditions are applicable to such policies, even if such conditions are not applicable when the NF receives the configuration update). Additionally, some embodiments may specify distinct groups or categories of NFs, where configuration updates may be applicable only to certain groups or categories of NFs. In some embodiments, routing or forwarding paths may be established, where such paths are used by NFs to propagate configuration changes in a distributed (e.g., decentralized) manner. The routing or forwarding paths may be established based on factors such as latency (e.g., the fastest propagation of configuration updates between various NFs), redundancy (e.g., multiple paths may include the same NF), geography (e.g., NFs that are implemented by respective sets of hardware that are geographically close to each other may be selected for a given path), etc., thus enhancing overall efficiency and performance of the network.

Examples are described herein in the context of a particular type of NF, namely a DU of a RAN of a wireless network. For example, because a RAN may include a relatively large quantity of DUs, the techniques described herein may exhibit a noticeable impact in terms of performance and robustness of the wireless network. In practice, the same or similar concepts may be implemented with respect to other types of NFs.

Figure 1:
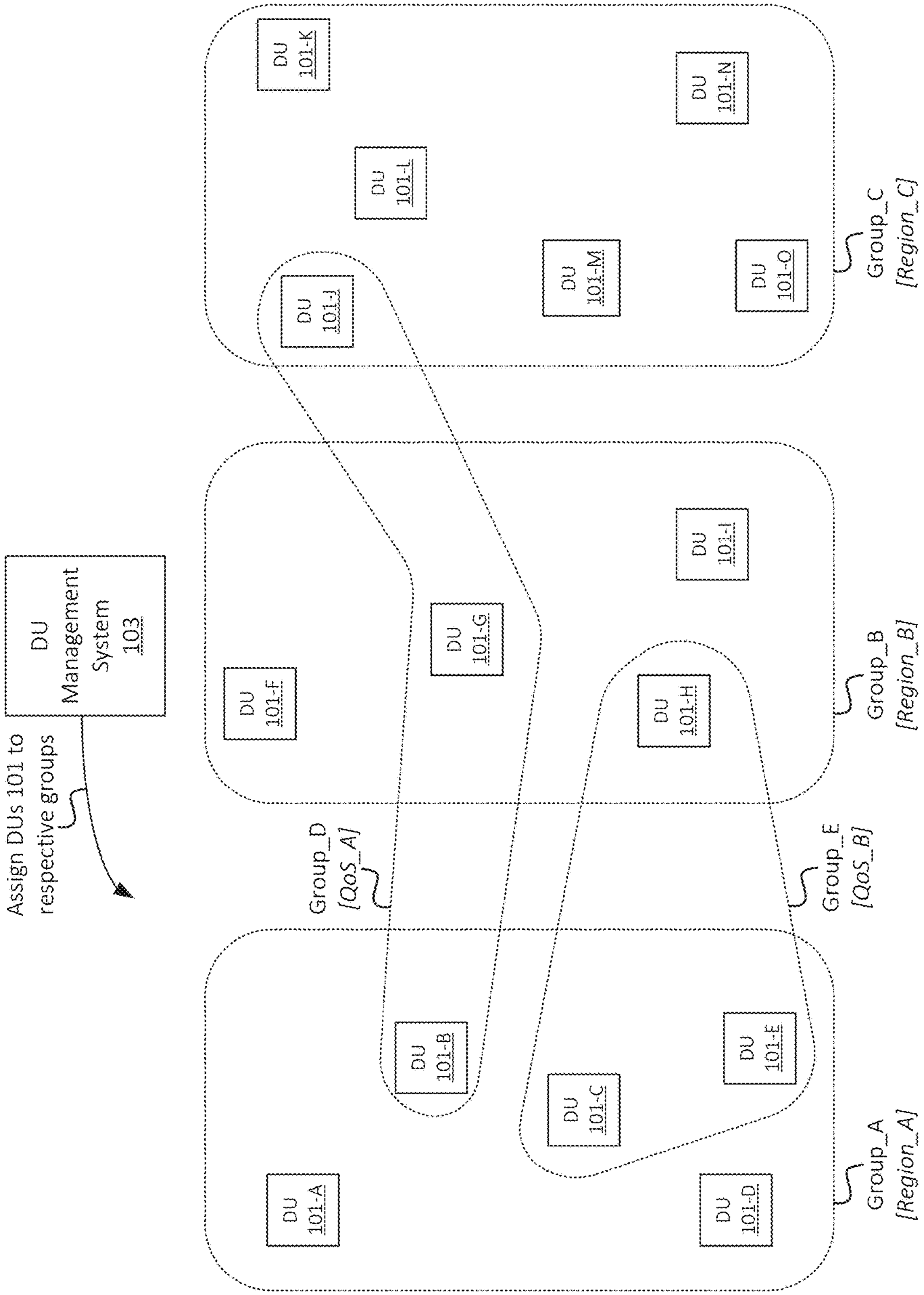

As shown in FIG. 1, a wireless network (e.g., a RAN of the wireless network) may include a relatively large quantity of DUs 101, including example DUs 101-A through 101-O. As discussed below, DUs 101 may perform particular operations with respect to the wireless network, such as performing baseband processing for traffic sent to or received from UEs (e.g., via radio units ("RUs") that are communicatively coupled to such DUs 101). The baseband processing may include, for example, lower layer processing, such that UEs are able to send and receive wireless signals to and from a core network via DUs 101 and one or more other devices (e.g., RUs, Central Units ("CUs"), etc.).

DUs 101 may be geographically distributed (e.g., located in different cities, towns, states, provinces, regions, countries, etc.), and/or may otherwise serve UEs that are located in different geographical regions. DU Management System ("DMS") 103 may be associated with an owner or operator of the network, and may have access to configure some or all DUs 101. For example, DMS 103 may maintain one or more keys or authentication tokens, or may otherwise implement one or more authentication mechanisms by which DUs 101 are able to verify and authenticate configuration instructions received from DMS 103. DMS 103 may also monitor or maintain information indicating attributes of each DU 101, such as location, hardware attributes (e.g., processor type or quantity, amount of memory, amount of storage space, make, model, etc.), load metrics (e.g., used or available capacity), performance metrics (e.g., latency, throughput, etc.), and/or other information regarding each DU 101. For example, DMS 103 may directly communicate with one or more DUs 101 (e.g., via an application programming interface ("API") or other suitable communication pathway), and/or may receive such information from some other suitable device or system that is able to monitor or determine such information.

In accordance with some embodiments, DMS 103 may assign DUs 101 to respective groups based on such attributes (e.g., location, hardware attributes, performance attributes, etc.). For example, DMS 103 may assign DUs 101-A through 101-E to a first group (e.g., "Group_A"), may assign DUs 101-F through 101-I to a second group (e.g., "Group_B"), and may assign DUs 101-J through 101-O to a third group (e.g., "Group_C"). Group_A, Group_B, and Group_C may each be associated with different geographical regions with which respective DUs 101 are associated (e.g., regions in which respective DUs 101 are located, and/or regions that are served by respective DUs 101). As discussed above, DMS 103 may receive or maintain information indicating the respective regions with which each DU 101 is associated, and may assign DUs 101 to these groups based on such information.

As further shown, DMS 103 may assign respective DUs 101 to groups based on factors in addition to, or in lieu of, geographical locations associated with such DUs 101. For example, as shown, DMS 103 may assign DUs 101-B, 101-G, and 101-J to a fourth group (e.g., "Group_D"), and may assign DUs 101-C, 101-E, and 101-H to a fifth group (e.g., "Group_E"). DMS 103 may assign such groups based on attributes of such DUs 101, such as QoS attributes. For example, the DUs 101 assigned to Group_D may be associated with a first set of QoS attributes (e.g., a first network slice, a first set of performance thresholds such as minimum throughput or maximum latency, a first set of Service Level Agreements ("SLAs"), etc.), and the DUs 101 assigned to Group_E may be associated with a second set of QOS attributes (e.g., a second network slice, a second set of performance thresholds, a second set of SLAs, etc.). Thus, in some situations, the same DU 101 may belong to multiple groups.

In some embodiments, DMS 103 may assign DU groups based on a likelihood of respective configuration updates being applicable to respective sets of DUs 101. For example, DMS 103 may identify that DUs 101-A through 101-E have a relatively high measure of likelihood of being updated with the same or similar configuration updates, while other DUs 101 have a relatively lower measure of likelihood of being updated in the same or similar manner as each other. In some embodiments, DMS 103 may utilize artificial intelligence/machine learning ("AI/ML") techniques or other suitable techniques to determine the measure of likelihood of the same or similar configuration updates being applicable to certain DUs 101. In some embodiments, the measure of likelihood may be determined based on attributes of such DUs 101, such as the example factors discussed above and/or different factors.

In some embodiments, "assigning" a given DU 101 to a given group may include DMS 103 providing information to such DU 101 that indicates that DU 101 is a member of the given group. In some embodiments, DMS 103 may provide information indicating one or more other DUs 101 that are in the same group (e.g., each DU 101 of a group may be "aware" of some or all other DUs that have been assigned to the group). For example, DMS 103 may provide an Internet Protocol ("IP") address, a DU identifier, a device identifier, or some other suitable identifying information for such DUs 101. In some embodiments, assigning a given DU 101 to a given group may include DMS 103 maintaining information indicating that the given DU 101 is in the given group, and/or providing an indication to one or more other devices (e.g., routers, switches, etc. that are in, or that implement, a routing path between one or more DUs 101) that the given DU 101 is in the given group. In some embodiments, assigning DUs 101 to respective groups may be performed without DMS 103 indicating groups to which such DUs 101 belong. For example, in some embodiments, DUs 101 may be "unaware" of groups or categories to which such DUs 101 have been assigned, and/or may be "unaware" of one or more other DUs 101 that have been assigned to the same group.

FIGS. 2 and 3 illustrate example data structures 201 and 301, respectively, that may be maintained by DMS 103 and/or one or more DUs 101. Data structure 201, in FIG. 2, illustrates an example of an indication, on a per-DU basis, of which group (or groups) to which each DU 101 has been assigned. For example, data structure 201 may include an identifier of DU 101-A, such as an IP address, DU identifier, etc. (denoted as "DU_A"), and an identifier of Group_A to which DU 101-A has been assigned. Similarly, data structure 201 may include an identifier of one or more other DUs 101 (e.g., denoted as "DU_B," "DU_C," etc.), as well as identifiers of respective groups to which DUs 101 have been assigned. Data structure 301, in FIG. 3, illustrates an example of an indication, on a per-group basis, of which DUs 101 have been assigned to each group. For example, data structure 301 may include an identifier of the first group (e.g., denoted as "Group_A"), as well as identifiers of DUs that have been assigned to the first group, an identifier of the second group (e.g., denoted as "Group_B"), as well as identifiers of DUs that have been assigned to the second group, and so on.

As noted above, and as shown in FIGS. 4-6, DMS 103 may establish routing and/or forwarding paths for propagating configuration updates (referred to herein as "configuration routing paths"). Configuration routing paths may refer to specific paths, hops, etc. that should be used by DUs 101 to propagate configuration changes initially provided by DMS 103 or some other authorized source. In some embodiments, DMS 103 may establish a configuration routing path for each group (e.g., each group of DUs 101 that has been established by DMS 103, as discussed above with respect to FIGS. 1-3). DMS 103 may select a configuration routing path based on factors such as performance (e.g., minimizing the amount of time for configuration updates to be routed to some or all DUs 101 of a given group), load balancing (e.g., avoiding overloading one or more DUs 101), redundancy (e.g., potentially setting a given DU 101 to receive configuration updates from multiple DUs 101), reliability (e.g., one or more DUs 101 may be associated with a measure of reliability or availability which indicates a likelihood that such DUs 101 will be operational, available, etc. at a given time), and/or other suitable factors.

In some embodiments, DMS 103 may select a configuration gateway DU for each group, which may be a particular DU 101 that serves as an entry point for configuration updates provided to the group. In some embodiments, DMS 103 may select the configuration gateway DU based on factors such as performance (e.g., based on latency between DMS 103 and a potential gateway DU), reliability (e.g., a measure of reliability, uptime, etc. of the potential gateway DU), geographical location (e.g., based on a distance between hardware that implements DMS 103 and hardware that implements the potential gateway DU), and/or other suitable factors. In some embodiments, DUs 101 may be pre-configured with routing paths or may themselves determine a routing path (e.g., a "next" DU 101 to which configuration updates should be forwarded). For example, in some embodiments, DUs 101 may not receive routing path information from DMS 103.

In some embodiments, DMS 103 may forgo selecting a configuration gateway DU for one or more groups, and/or may dynamically determine one or more DUs 101 of a given group to which configuration updates should be provided by DMS 103. In some embodiments, DMS 103 may provide group identification information with configuration updates, based on which any DUs 101 receiving such updates may determine whether these updates are applicable to respective DUs 101 (e.g., a given DU 101 may determine whether a received configuration update identifies a group to which the given DU 101 belongs), and may apply such updates if applicable to such DUs 101.

Figure 4:
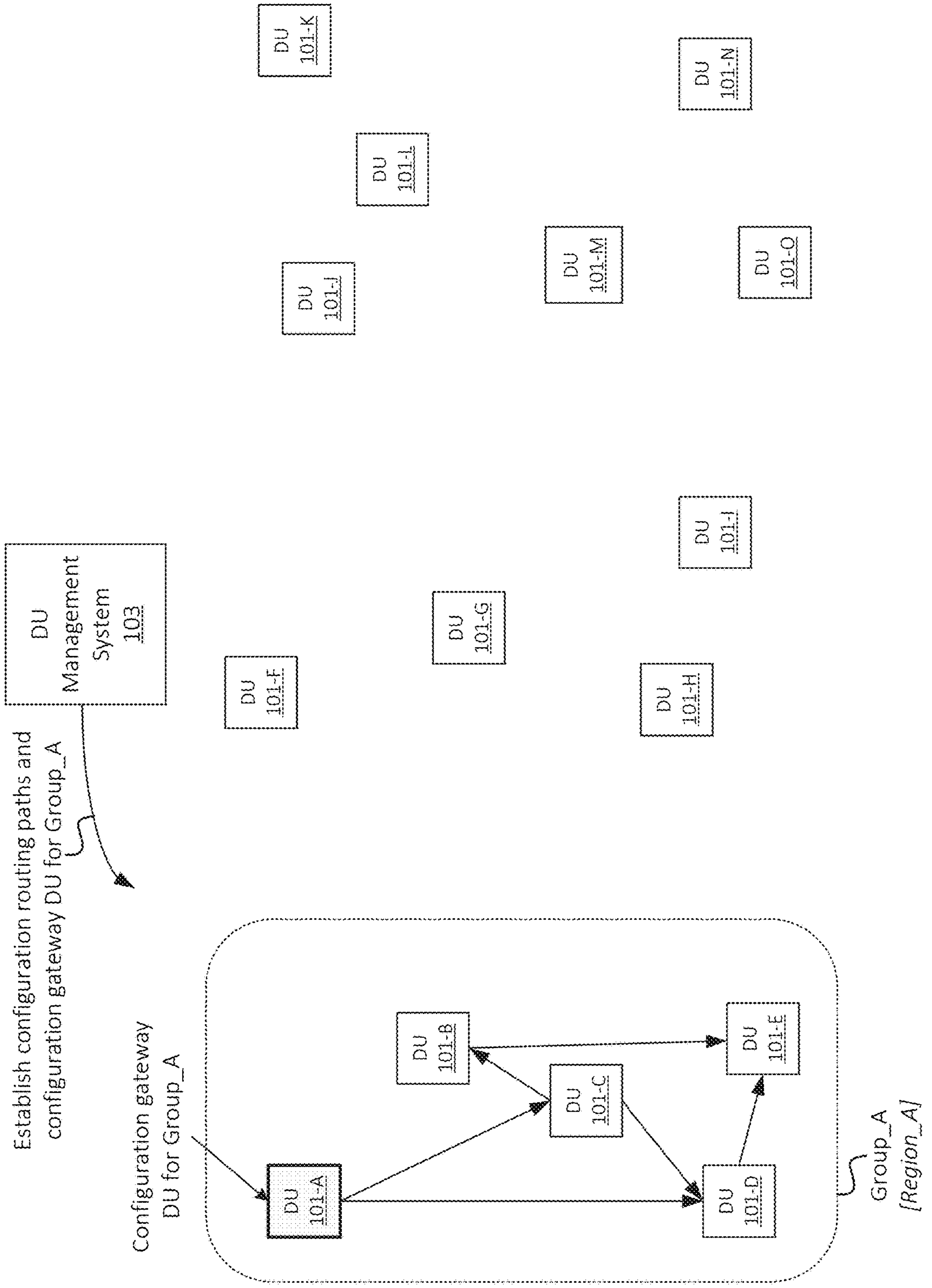

In the example of FIG. 4, DMS 103 may select DU 101-A as a DU gateway for Group_A. In situations where DMS 103 has information, instructions, etc. (e.g., a configuration update) for Group_A, DMS 103 may forward such information to DU 101-A. In this example, the configuration routing path for Group_A specifies that DU 101-A should forward configuration updates to DUs 101-C and 101-D. Accordingly, when receiving a configuration update from DMS 103, DU 101-A may proceed to forward such configuration update to DUs 101-C and 101-D. As further shown, DU 101-C may forward the configuration update to DUs 101-B and 101-D, and DU 101-D may forward the configuration update to DU 101-E.

For example, DU 101-D may be associated with a redundancy measure whereby DU 101-D receives configuration updates from DUs 101-A and 101-C. This redundancy measure may be useful in situations where, for example, DU 101-C becomes non-operational, a communication link between DU 101-C and DU 101-D becomes congested or non-operational, a communication link between DU 101-C and DU 101-A becomes congested or non-operational, etc. In some embodiments, when receiving multiple instances of the same configuration update (e.g., from both DU 101-A and DU 101-C), DU 101-D may forward each instance of the same configuration update (e.g., to DU 101-E). In some embodiments, DU 101-D may forgo forwarding a duplicate copy of the configuration update (e.g., may only send a particular configuration update to DU 101-E once, even if the same particular configuration update has been received from DUs 101-A and 101-C). In some embodiments, DUs 101 may maintain a maximum quantity of previously received configurations (e.g., the last ten received configurations, the last 25 received configurations, etc.), may maintain a maximum age of configurations (e.g., configurations that are no more than one day old, configurations that are no more than one week old, etc.), and/or may otherwise maintain "fresh" configurations or avoid maintaining "stale" configurations.

Figure 5:
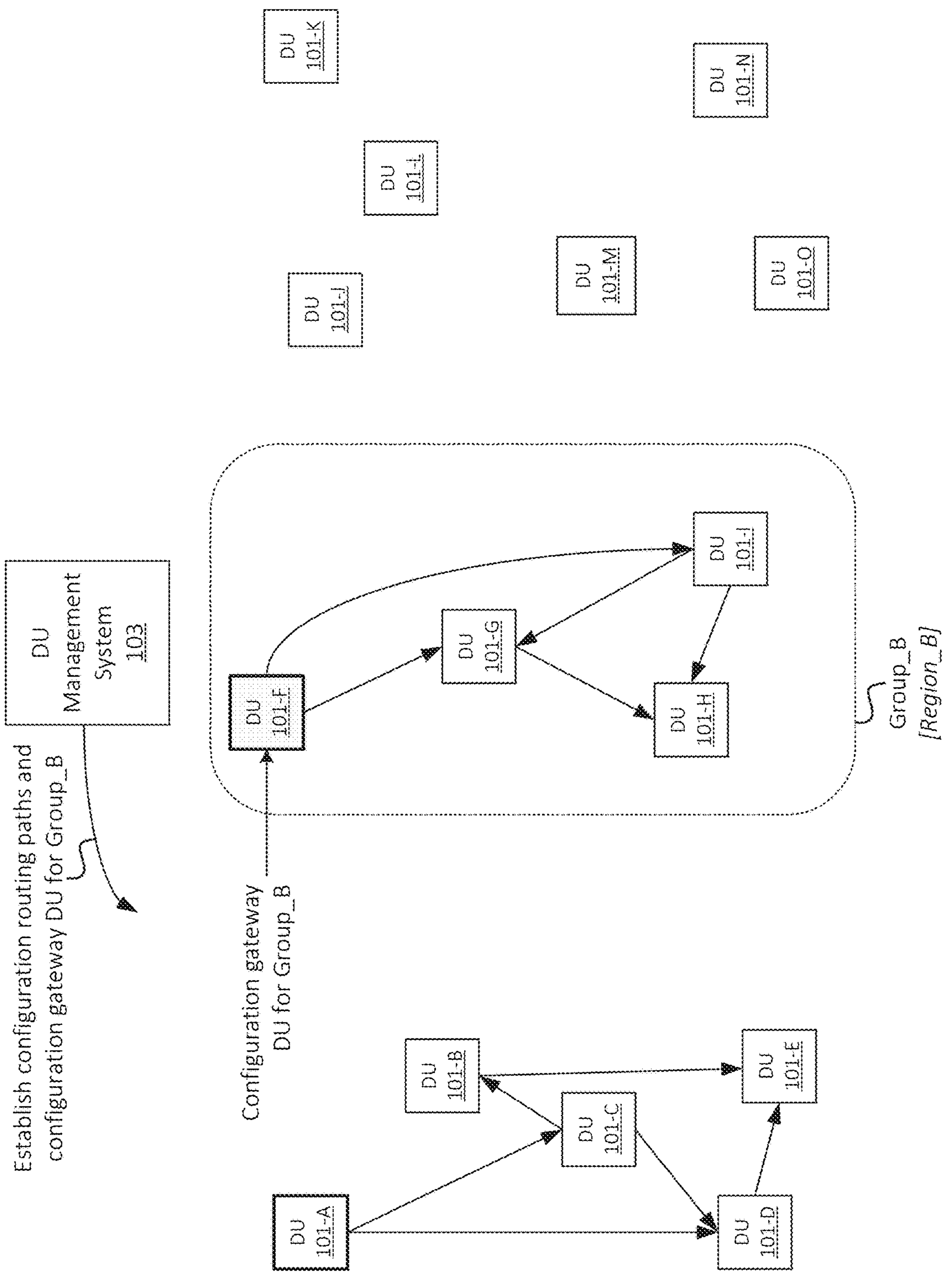
Figure 6:
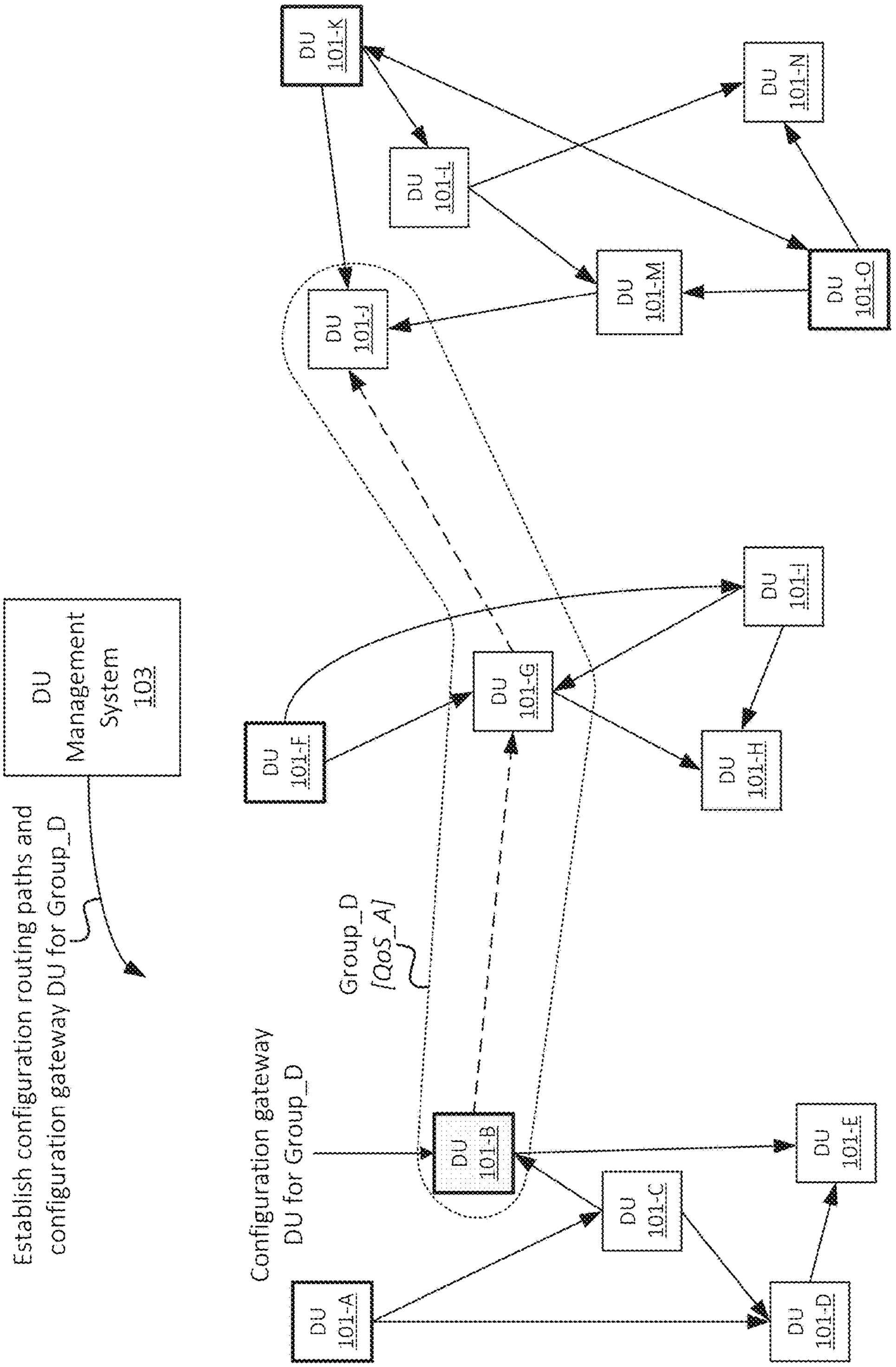

FIG. 5 similarly illustrates the designation of an example configuration routing path for Group_B, as well as the designation of DU 101-F as the configuration gateway DU for Group_B. FIG. 6 illustrates the designation of an example routing path for Group_D. As noted above, Group_D includes DUs 101 of multiple other groups. For example, DU 101-B of Group_D is also a member of Group_A (e.g., as shown in FIG. 1), DU 101-G of Group_D is also a member of Group_B, and DU 101-J of Group_D is also a member of Group_C.

As further shown, DMS 103 may designate DU 101-B as a configuration gateway DU for Group_D. That is, while DU 101-B is not the configuration gateway DU for Group_A, DU 101-B is the configuration gateway for Group_D.

In some embodiments, DMS 103 may designate multiple DUs 101 as gateway configuration DUs for a given group. For example, DMS 103 may designate DUs 101-K and 101-O as gateway configuration DUs for Group_C. Thus, in situations where DMS 103 or some other suitable device or system has a configuration update to provide to Group_C, DMS 103 may output such information to DUs 101-K and 101-O, which may proceed to forward the updates according to a routing configuration path associated with Group_C.

As noted above, in some embodiments, DUs 101 may be "aware" of one or more groups to which they have been assigned, such as by receiving such information from DMS 103. For example, DU 101-A may maintain information indicating that DU 101-A is a member of Group_A. As another example, DU 101-B may maintain information indicating that DU 101-B is a member of Group_A, Group_D, or both Group_A and Group_D). In some embodiments, as noted above, DU 101-A and/or DU 101-B may not be "aware" that DUs 101-A and 101-B are members of such groups.

Figure 7:
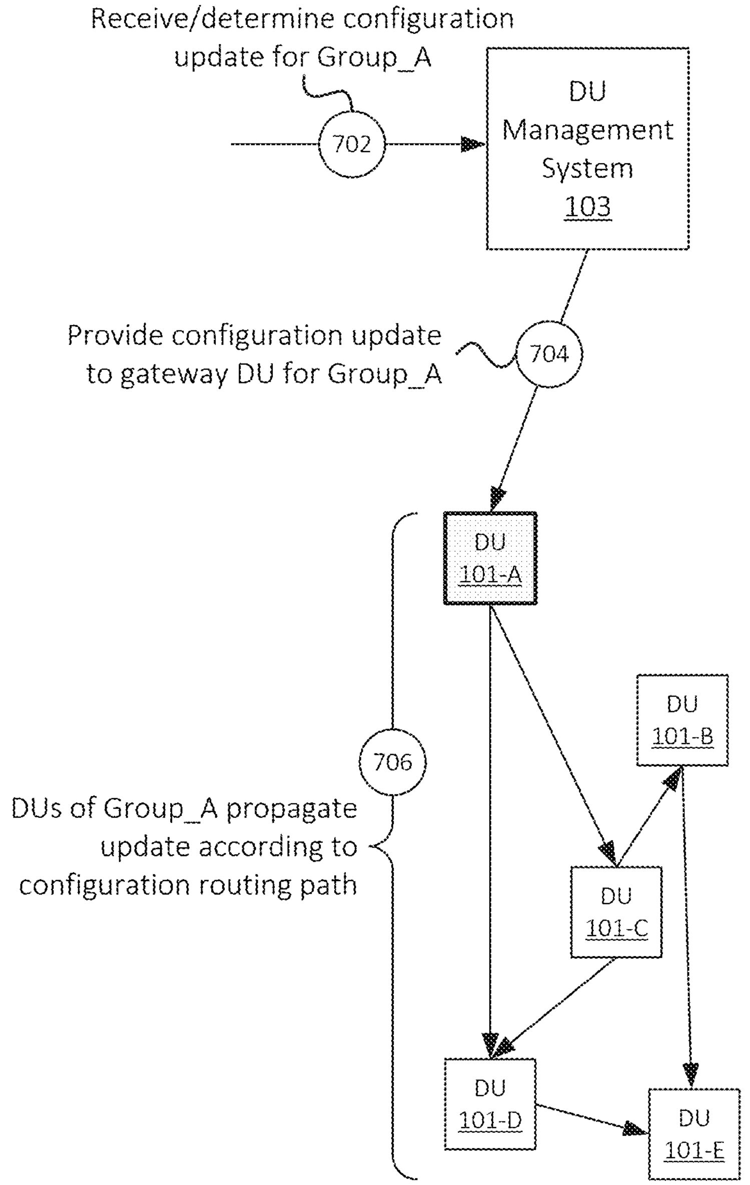
FIG. 7 illustrates an example of NFs propagating a configuration update based on an assigned configuration routing path, in accordance with some embodiments.

FIG. 7 illustrates an example propagation of a configuration update in a distributed manner, in accordance with some embodiments. As shown, DMS 103 may receive or determine (at 702) a configuration update for a particular group of DUs 101 (or one or more other types of NFs). For example, DMS 103 may receive such information from an administrator or operator of a wireless network with which DMS 103 is associated, or may otherwise receive or generate the configuration update based on automated techniques such as AI/ML techniques. DMS 103 may provide (at 704) the configuration update to one or more DUs 101 of Group_A, such as a gateway DU for Group_A (e.g., DU 101-A). As described in more detail below, DUs 101-A through 101-E of Group_A may propagate (at 706) the configuration update in accordance with a configuration routing path as determined by DMS 103. In some embodiments, each DU 101 of Group_A may selectively apply the configuration update, as described in more detail below.

In one example scenario, the configuration update may be applicable to one or more DUs 101 of Group_A, but may not be applicable to DUs 101 of other groups. For example, the configuration update may include parameters, values, variables, instructions, etc. that control the operation of DUs 101. The configuration update may indicate changes in QoS parameters, access parameters, queuing parameters, routing parameters, or other parameters to be implemented by some or all DUs 101 of Group_A.

The configuration update may, in some embodiments, include identifiers of particular DUs 101 to which the configuration update applies. For example, if the configuration update is applicable to DUs 101-C and 101-D, the configuration update may include respective identifiers of DUs 101-C and 101-D, or other information based on which DUs 101-C and 101-D are able to identify that the configuration update is applicable to DUs 101-C and 101-D, and/or based on which other DUs 101 of Group_A are able to identify that the configuration update is not applicable to such other DUs 101.

For example, in some embodiments, DUs 101 may determine that a given configuration update is applicable to such DUs 101 based on a group identifier associated with the configuration update. In some embodiments, DUs 101 may determine that a given configuration update is applicable to such DUs 101 based on a DU identifier associated with the configuration update. In some embodiments, DUs 101 may determine that a given configuration update is applicable to such DUs 101 based on a group identifier associated with the configuration update as well as a DU identifier associated with the configuration update. In some embodiments, DUs 101 may determine that a given configuration update is applicable to such DUs 101 based on information in addition to, or in lieu of, a group identifier or DU identifier included in the configuration update.

Figure 8A:
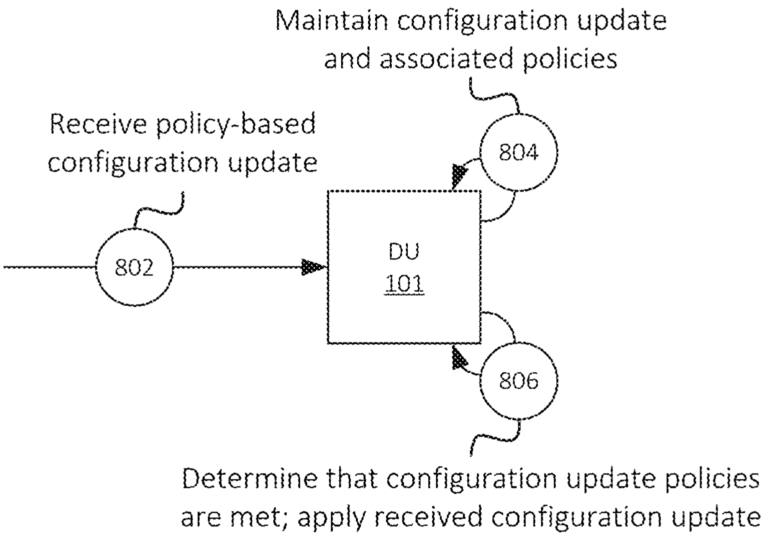
FIGS. 8A and 8B illustrate an example of NFs selectively applying configuration updates based on one or more policies, in accordance with some embodiments.

For example, as shown in FIG. 8A, a particular DU 101 may receive (at 802) a particular configuration update that includes a set of configuration update policies. Such policies may include conditions, criteria, etc. that may be evaluated by DU 101 in order to determine whether the configuration update should be applied by DU 101. For example, the configuration update policies may include criteria such as device type or attributes (e.g., a make, model, quantity or type of processors, etc. of hardware that implements DU 101), peripheral or connected device attributes (e.g., a make or model of an RU that is communicatively coupled to DU 101, frequencies or bands implemented by such RU, etc.), load thresholds (e.g., an indication that the update should be applied if DU 101 is exhibiting less than a threshold measure of load), temporal conditions (e.g., an indication that the update should be applied at certain times of day), or other suitable criteria, conditions, policies, etc.

DU 101 may maintain (at 804) the configuration update as well as the associated policies. For example, in some situations, the configuration update may not be applicable to DU 101 at the time that DU 101 receives (at 802) the configuration update. As one example, DU 101 may be exhibiting greater than a threshold measure of load indicated in the configuration update policies at the time that DU 101 receives the configuration update. In this situation, DU 101 may maintain (e.g., cache, store, etc.) the configuration update, such that the configuration update may potentially be applied at a later time. For example, at some time after DU 101 receives (at 802) the configuration update and the associated policies, DU 101 may determine (at 806) that the criteria, conditions, etc. indicated in the configuration update policies are met. For example, a measure of load associated with DU 101 may have reduced over time, and such measure of load may fall below the threshold measure of load indicated in the configuration update policy. DU 101 may accordingly apply the update based on detecting that the measure of load of DU 101 has fallen below the threshold measure of load indicated in the configuration update policy.

Figure 8B:
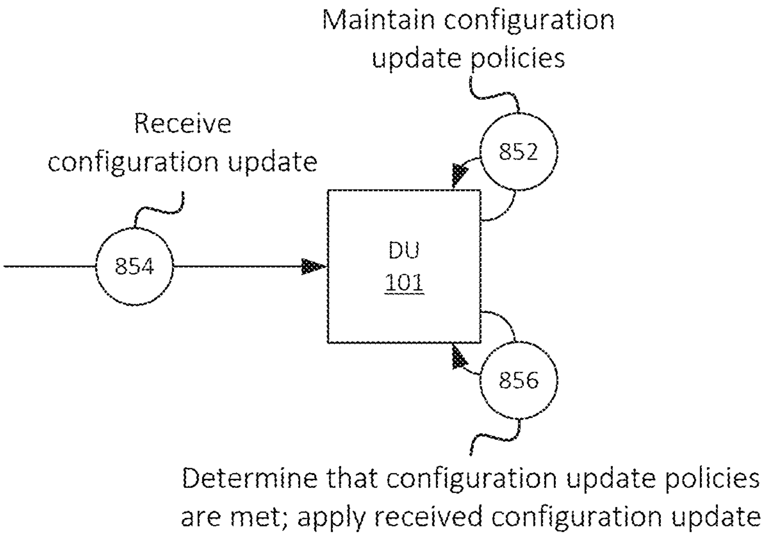

In some embodiments, as shown in FIG. 8B, one or more DUs 101 may maintain (at 852) a set of configuration update policies. For example, DUs 101 may be provisioned, configured, etc. by DMS 103 or some other suitable device or system, to include such configuration update policies. In some embodiments, configuration update policies maintained (e.g., at 852) by DU 101 may be independent of or separate from configuration update policies received as part of a configuration update. For example, DU 101 may receive (at 854) a particular configuration update, which may or may not include any additional configuration update policies, criteria, conditions, etc.

As similarly noted above, situations may occur in which the configuration update is not applicable at the time that DU 101 receives (at 854) the configuration update. For example, one or more configuration update policies maintained (at 852) may not be satisfied at the time the configuration update is received. In some embodiments, DU 101 may maintain (e.g., cache, store, etc.) the configuration update (e.g., for seconds, minutes, hours, days, etc.) and may, at a later time, determine (at 856) that the configuration update policies are met. DU 101 may accordingly apply the received configuration update based on determining that such configuration update policies are met.

For example, similar to the example described above with respect to FIG. 8A, a particular configuration update policy maintained (at 852) by DU 101 may indicate that DU 101 may apply configuration updates only when DU 101 is exhibiting less than a threshold measure of load. In an example scenario, DU 101 may receive (at 854) the configuration update while DU 101 is exhibiting greater than the threshold measure of load, and the measure of load of DU 101 may later fall below the threshold measure of load, at which time DU 101 may apply (at 856) the received configuration update.

In some embodiments, applying a given configuration update may include modifying one or more parameters, values, settings, etc. associated with DU 101. In some embodiments, applying a given configuration update may include installing an image, set of files, installation package, etc. included or indicated in a configuration update. In some embodiments, DU 101 may maintain a value representing a current configuration of DU 101 (e.g., a cryptographic hash of one or more values, variables, settings, parameters, etc.). A given configuration update may include a value representing an updated configuration (e.g., as indicated in the configuration update), such as a cryptographic hash of one or more values, variables, settings, parameters, etc. indicated in the configuration update. In some embodiments, DU 101 may compare these values (e.g., the cryptographic hash of the current configuration of DU 101 and the cryptographic hash of the configuration update) to determine whether to apply the configuration update. For example, in situations where these values match, DU 101 may forgo applying the configuration update, as a match of these values may indicate that the configuration update does not reflect any changes to the current configuration of DU 101.

In some embodiments, the policies maintained by one or more DUs 101 may be used to modify values, parameters, settings, etc. included in a configuration update. For example, one or more DUs 101 (e.g., DUs of a given group of DUs 101) may be configured (e.g., by DMS 103 or some other suitable device or system) with a set of policies that include coefficients, multipliers, modifiers, conditions, or other operations to perform on configuration updates. For example, DMS 103 may configure DUs 101 of a first geographical region, such as a rural area (e.g., DUs 101 of Group_A), to modify values of a particular type using a first coefficient, and may configure DUs 101 of a second geographical region, such as an urban area (e.g., DUs 101 of Group_B) to modify values of the same particular type using a second coefficient. In this manner, DUs 101 of different groups may receive the same configuration update, but may apply the configuration update differently. This type of policy (e.g., a configuration modification policy) may be useful to account for distinct attributes of different DUs 101 or groups of DUs 101, such as geographical region in which such DUs 101 are located, usage patterns of UEs that receive connectivity via such DUs 101, etc.

In some embodiments, when performing a configuration update, DUs 101 may maintain one or more previous configurations. In this manner, DUs 101 may be able to "roll back" changes in scenarios such as topology modification or instructions (e.g., from DMS 103) to implement a previous configuration.

Figure 9:
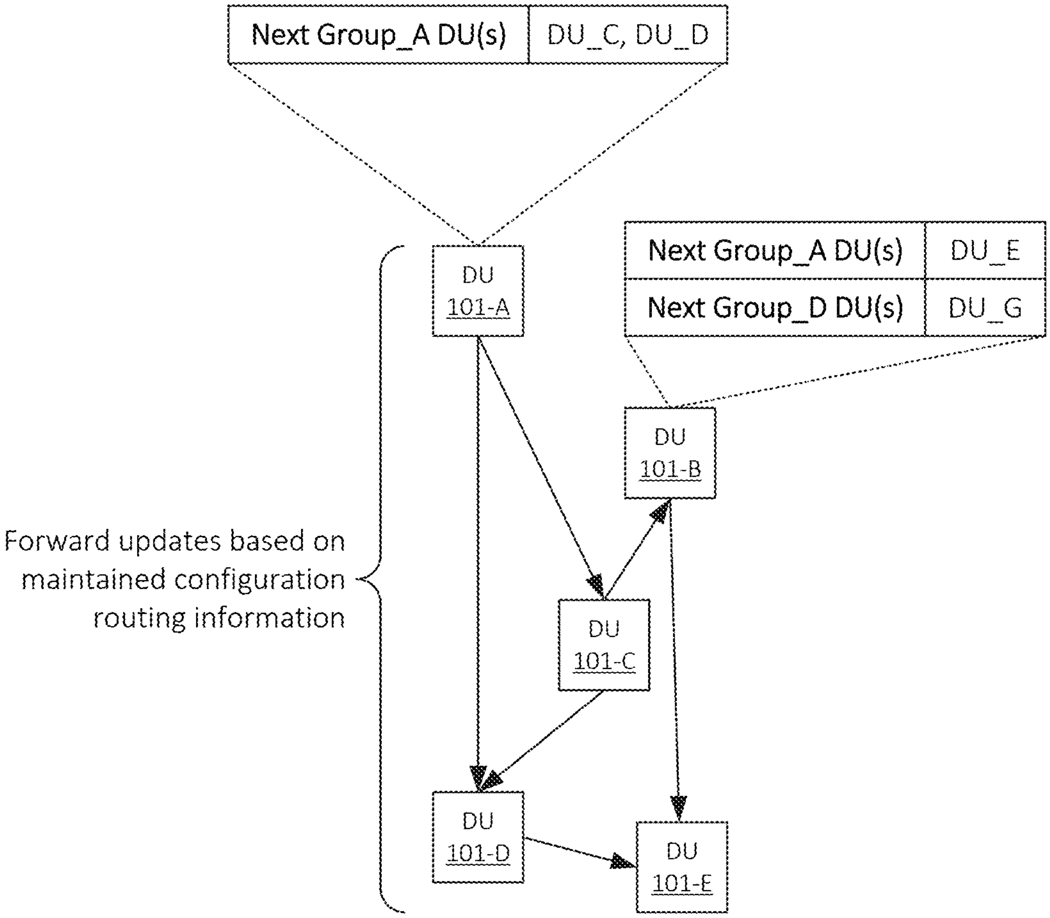
FIGS. 9 and 10A-10E illustrate examples of NFs propagating a configuration update in a distributed manner based on an assigned configuration routing path, in accordance with some embodiments.

FIGS. 9 and 10A-10E illustrate further examples of how DUs 101 may forward, route, etc. configuration updates in a distributed manner, in accordance with some embodiments. As shown in FIG. 9, DUs 101 may each maintain information associating each respective DU with a given DU group, as well as DUs 101 that are immediately "downstream" in the DU group. As one example, as shown, DU 101-A may maintain information indicating that DU 101-A is a member of Group_A, and the next DUs 101 in the forwarding path of Group_A are DUs 101-C and 101-D. Thus, in some embodiments, DU 101-A may receive a configuration update that includes an indication that such configuration update is associated with Group_A. In such embodiments, DU 101-A may identify, based on the indication that the configuration update is associated with Group_A, that DU 101-A should forward the configuration update to DUs 101-C and 101-D.

As noted above, example DU 101-B may be associated with Group_A and Group_D. Accordingly, DU 101-B may, in some embodiments, maintain information associating DU 101-B with these multiple groups, as well as information indicating which DUs 101 are downstream of DU 101-B. Thus, in a situation where DU 101-B receives a configuration update that is associated with Group_A, DU 101-B may forward such configuration update to DU 101-E. Similarly, when DU 101-B receives a configuration that is associated with Group_D, DU 101-B may forward such configuration update to DU 101-G.

Additionally, or alternatively, as noted above, DUs 101 may not maintain or use any information associating such DUs 101 with a DU group and/or indicating which DUs 101 are next in a configuration routing path associated with such DU groups. For example, in such embodiments, DMS 103 may specify a configuration routing path when providing a configuration update. In this manner, when modifications or changes to the configuration routing path are determined by DMS 103, DMS 103 does not need to notify DUs 101 of changes to the configuration routing path.

Figure 10A:
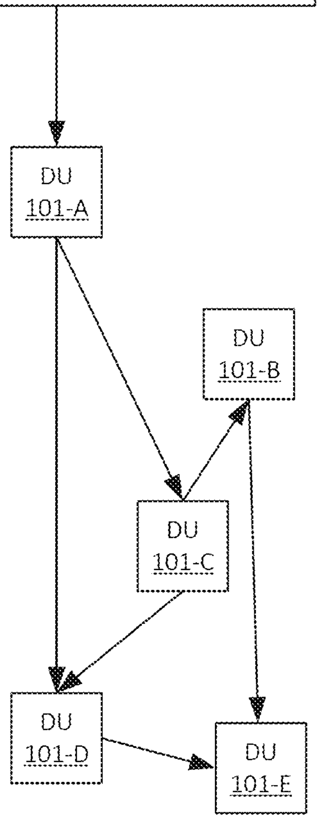

For example, as shown in FIG. 10A, DU 101-A (e.g., a gateway DU for Group_A) may receive a configuration update (e.g., from DMS 103), along with an indication of one or more configuration routing paths for the update. In this example, three configuration routing paths are indicated ("Path_A," "Path_B," and "Path_C"). As discussed above, DU 101-A may apply the configuration update, cache the configuration update, determine whether the configuration update is applicable to DU 101-A (e.g., based on one or more policies maintained by DU 101-A and/or included in the update), and/or may perform other suitable operations.

Figure 10B:
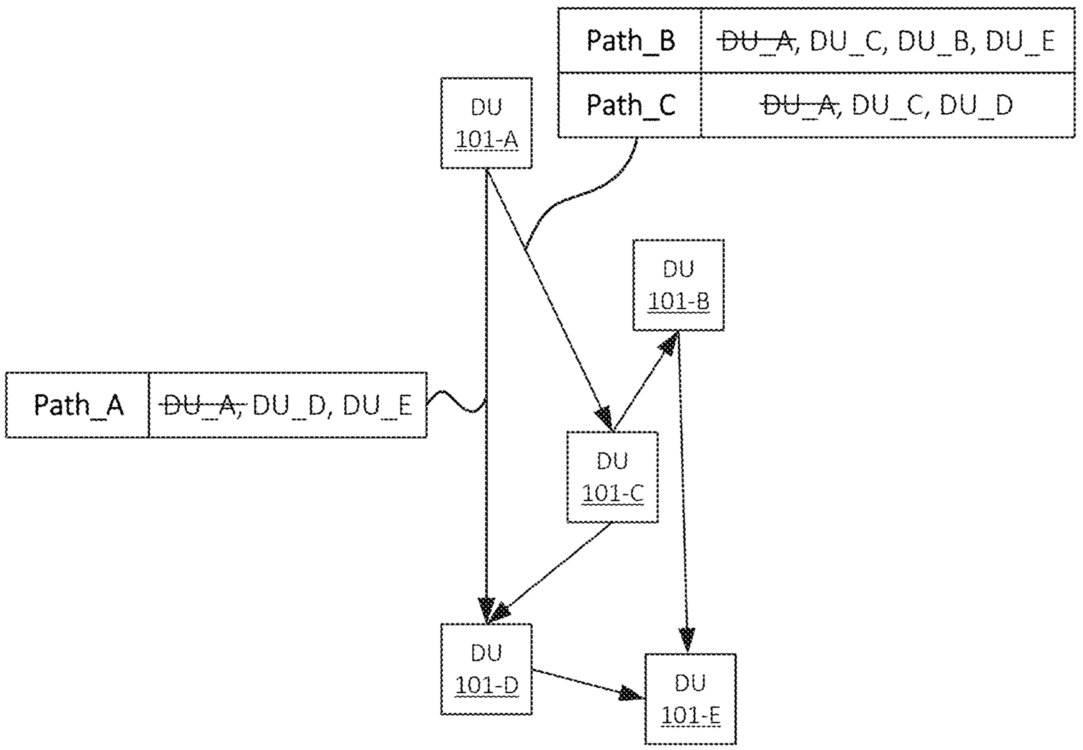

DU 101-A may further identify that the configuration update should be forwarded to DUs 101-C and 101-D. For example, example Path_A indicates that the configuration update should be forwarded by DU 101-A to DU 101-D, and Path_B and Path_C indicate that the configuration update should be forwarded by DU 101-A to DU 101-C. DU 101-A may, as shown in FIG. 10B, forward the update accordingly. In some embodiments, DU 101-A may include some or all of the configuration routing information when forwarding the configuration update. In some embodiments, DU 101-A may modify the configuration routing information prior to forwarding the configuration update. For example, DU 101-A may remove itself (and/or one or more other devices, such as a source from which the configuration update was received, such as "upstream" DUs 101) from the configuration routing paths when forwarding the configuration update. In this manner, DUs 101 that receive configuration updates in this manner may, in some embodiments, not receive routing information indicating "upstream" DUs 101 that were in the configuration routing path. For example, DU 101-D may receive information indicating that DU 101-D is in Path_A, and may also receive information indicating that DU 101-E is in Path_A. Similarly, DU 101-C may receive information indicating that DU 101-C is in Path_B and Path_C, and may also receive information indicating respective DUs 101 that are in these configuration routing paths.

Figure 10C:
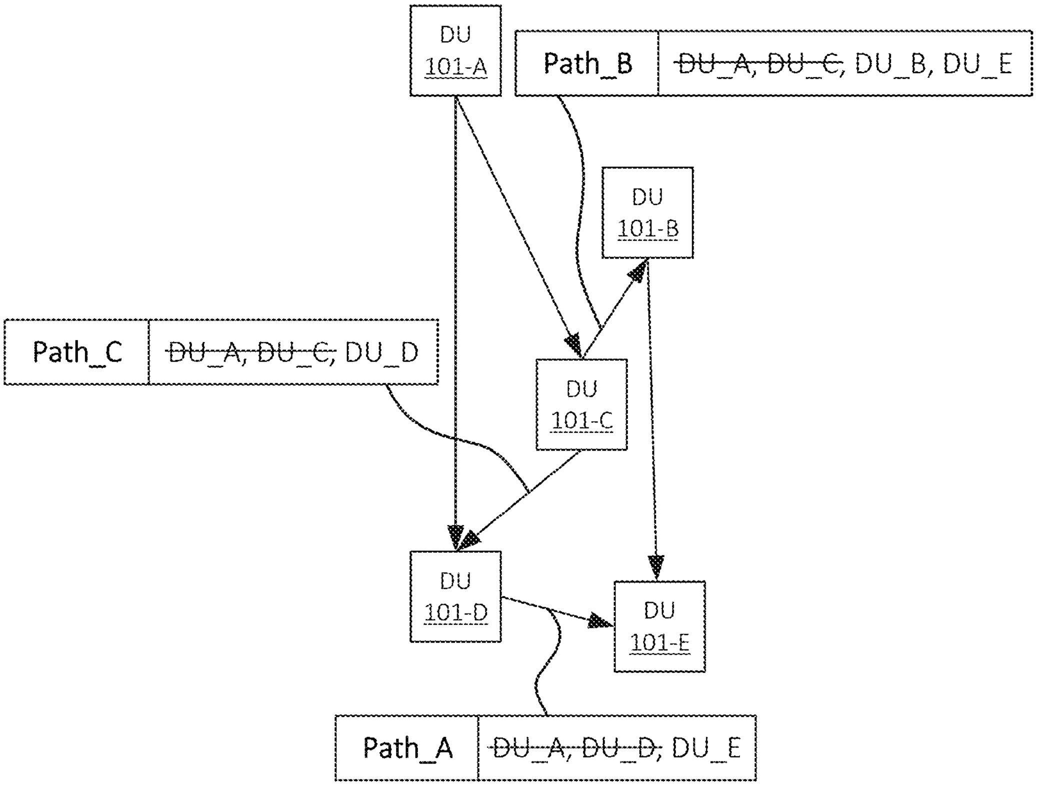

As shown in FIG. 10C, DUs 101-C and 101-D may route the configuration update accordingly (e.g., in addition to applying, caching, etc. the configuration update themselves). For example, DU 101-D may forward the configuration update and routing information to DU 101-E (e.g., where such routing information omits DU 101-D, in accordance with some embodiments). Similarly, DU 101-C may forward the configuration update and routing information to DUs 101-B and 101-E (e.g., where such routing information omits DU 101-C, in accordance with some embodiments). In this manner, the size of the configuration update may be reduced at each "hop" (e.g., by virtue of removing DUs 101 from the routing path information when forwarding the configuration update). In some embodiments, the routing path information may be encrypted, and may be decrypted by each DU 101 in the routing path, thus maintaining the security of the routing information.

Figure 10D:
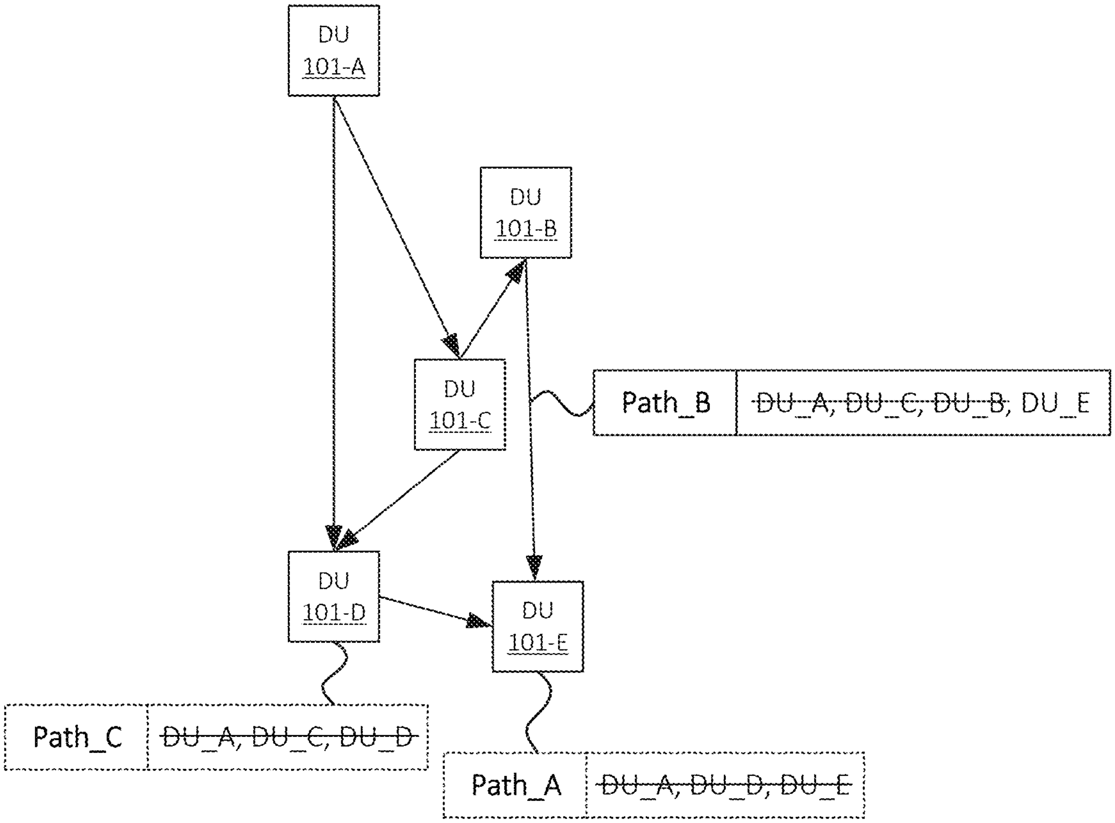
Figure 10E:
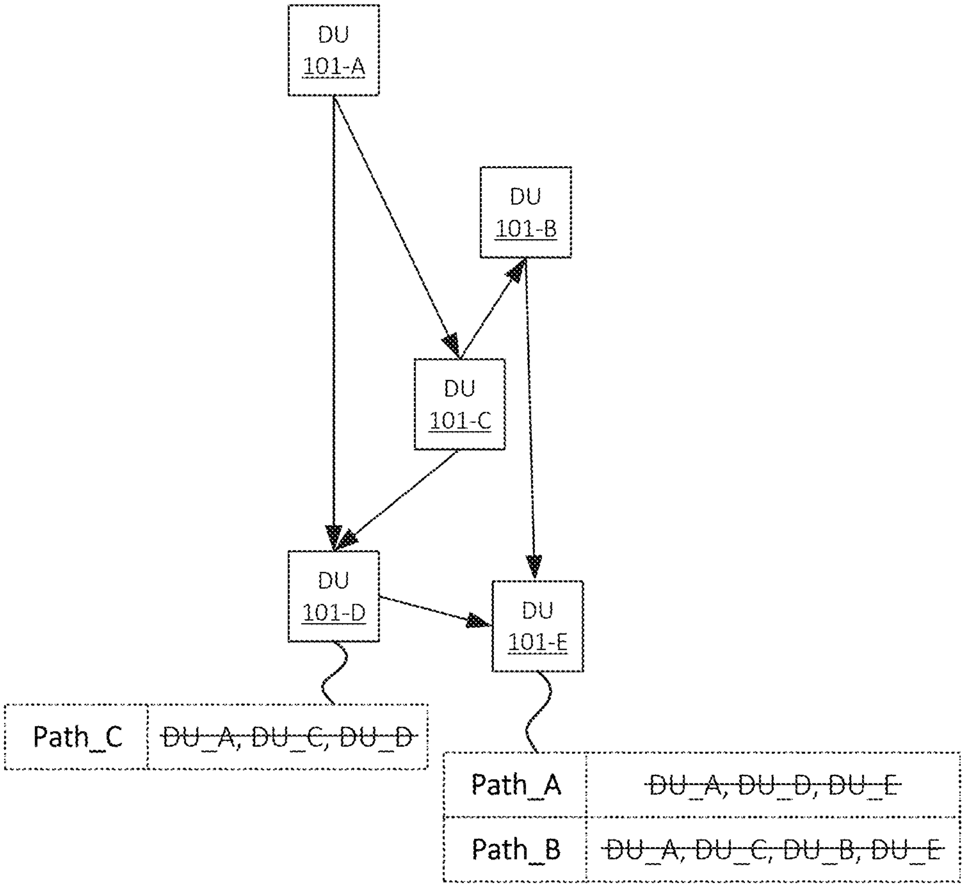

As shown in FIG. 10D, DU 101-E may cease forwarding the configuration update to any other DU 101, as DU 101-E is the last DU 101 in the respective configuration routing path (e.g., Path_A). Similarly, DU 101-D may cease forwarding the configuration update to any other DU 101, as DU 101-D is the last DU 101 in the respective configuration routing path (e.g., Path_C). Similarly, as shown in FIG. 10E, DU 101-E may again receive the configuration update from DU 101-B (e.g., via Path_B), but may forgo forwarding the configuration update to any other DUs 101 as DU 101-E is the last DU 101 in this particular configuration routing path.

While FIGS. 10A-10E illustrate one example set of configuration routing paths, in practice, different configuration routing paths may be implemented in accordance with some embodiments. For example, in some embodiments, a first configuration routing path may include (in sequence) DUs 101-A, 101-D, 101-C, 101-B, and 101-E. A second configuration routing path may include (in sequence) DUs 101-A, 101-C, 101-D, 101-E, and 101-B. A third configuration routing path may include (in sequence) DUs 101-A, 101-C, 101-B, 101-E, and 101-D. In such an example, all configuration routing paths may include all DUs 101 of the group, but in different sequences.

Figure 11:
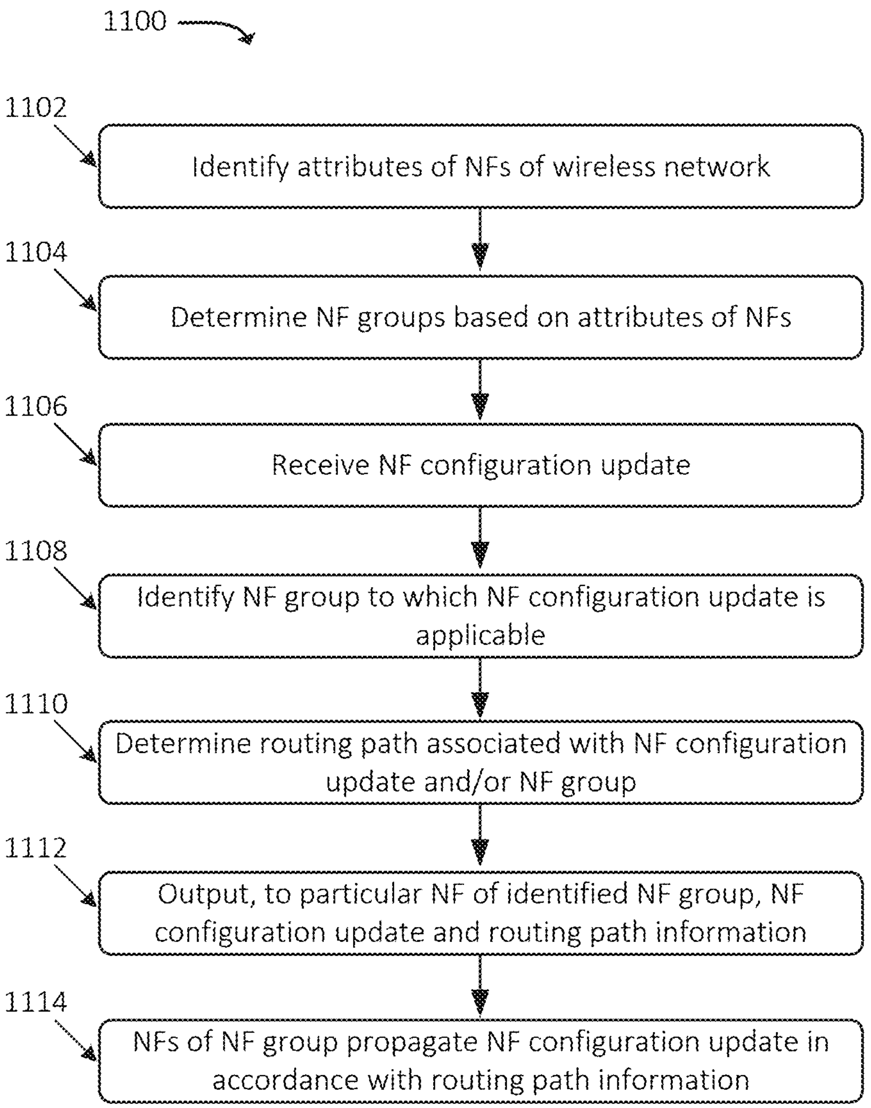
FIG. 11 illustrates an example process for propagating a configuration update in a distributed manner based on an assigned configuration routing path, in accordance with some embodiments.

FIG. 11 illustrates an example process 1100 for propagating a configuration update in a distributed manner based on a configuration routing path (e.g., as assigned by DMS 103 and/or as automatically determined by DUs 101 and/or some other suitable device or system). In some embodiments, some or all of process 1100 may be performed by DMS 103. In some embodiments, one or more other devices may perform some or all of process 1100 in concert with, and/or in lieu of, DMS 103. As noted above, examples above were provided in the context of the configuration of DUs 101 of a wireless network. In practice, and as described with respect to FIG. 11, similar operations may be performed with respect to any suitable type of NF of a wireless network.

As shown, process 1100 may include identifying (at 1102) attributes of NFs of a wireless network. For example, as discussed above, DMS 103 may identify attributes of one or more NFs of a wireless network, such as geographical region, hardware attributes, performance metrics, load metrics, etc. The attributes may be monitored or determined on an ongoing basis, such that DMS 103 maintains up-to-date attribute information of the NFs. The NFs referred to herein may be multiple instances of the same type of NF, such as geographically distributed instances that are implemented on discrete sets of hardware resources.

Process 1100 may further include determining (at 1104) one or more NF groups based on the attributes of the NFs. For example, DMS 103 may select particular NFs (e.g., NF instances) that have the same or similar attributes, that are associated with a relatively high measure of likelihood of receiving the same or similar configuration updates, and/or that should be grouped based on one or more other suitable factors. As discussed above, situations may arise in which one particular NF (or NF instance) is assigned to multiple NF groups. For example, the particular NF may share attributes with different sets of NFs, and may accordingly be assigned to multiple NF groups. As discussed above, in some embodiments, DMS 103 may indicate the assignment of one or more NF groups to the NFs of such NF groups. On the other hand, in some embodiments, DMS 103 may forgo providing such indication (e.g., NFs may be "unaware" of having been assigned to a respective NF group).

Process 1100 may additionally include receiving or determining (at 1106) an NF configuration update. The configuration update may include values, parameters, variables, etc. that, when applied by a given NF, modify parameters of operation of the NF. Such configuration update may have been determined for load balancing purposes, to improve the performance of one or more NFs, and/or to otherwise improve the efficiency or operation of the network.

Process 1100 may also include identifying (at 1108) a particular NF group to which the NF configuration update is applicable. For example, DMS 103 may identify that the NF configuration update is applicable to NFs of a particular geographical region, NFs that are implemented by a particular type of hardware, etc. Additionally, or alternatively, the NF configuration update may include an indication of specific NFs to which the NF configuration update is applicable.

Process 1100 may further include determining (at 1110) a routing path associated with the NF configuration update and/or with the identified particular NF group. For example, as discussed above, DMS 103 may identify a routing path such that NFs of the particular NF group are able to propagate the configuration update, without relying on a communication link between all of the NFs of the group and DMS 103. The routing path may be selected based on factors such as speed of propagation, geographical location, redundancy, and/or other suitable factors, as discussed above. The routing path may specify one or more sequences of NFs (e.g., a first NF should route the NF configuration update to a second NF, the second NF should route the NF configuration update to a third NF, and so on).

Process 1100 may additionally include outputting (at 1112), to a particular NF of the identified NF group, the NF configuration update and routing path information. For example, as discussed above, DMS 103 may select a configuration gateway NF based on one or more suitable factors, and may provide the NF configuration update to the configuration gateway NF. In some embodiments, DMS 103 may explicitly notify some or all of the NFs of the routing path (e.g., prior to providing the NF configuration update to one or more NFs of the group). Additionally, or alternatively, DMS 103 may include the routing path with the NF configuration update. As discussed above, the NFs of the NF group may propagate (at 1114) the configuration update in accordance with the routing path information (e.g., in a distributed manner). As discussed above, the NFs may further determine whether the NF configuration update is applicable to such NFs based on one or more policies maintained by the NFs, may cache the NF configuration update, and/or may perform other suitable operations with respect to the NF configuration update.

In this manner, NFs may communicate in a distributed manner in order to propagate NF configuration updates, without relying on centralized links between the NFs and a management or configuration platform. These techniques may also be employed in architectures in which NFs of a given group are not directly connected to all NFs of the same group (e.g., configuration updates may be routed via multiple NFs of such group in order to ultimately propagate the updates to all NFs of the group).

In accordance with some embodiments, DMS 103 may assign granular configuration routing paths, in which various network elements may be configured to synchronize, propagate, etc. configuration updates, firmware updates, and/or other types of configuration information or updates on a granular basis. For example, a particular network element may be configured, in accordance with some embodiments, to route, forward, propagate, etc. updates to one parameter (or set of parameters) to one network element, but may be configured to route, forward, propagate, etc. updates to a different parameter (or set of parameters) to a different network element. In this manner, the configuration routing paths described above may be applied in a more specific and dynamic manner, thus further enhancing the flexibility and configurability of elements of the network.

As similarly discussed above, the granular configuration routing paths are described below in the context of DUs 101 communicating with each other to provide configuration information, parameter information, updates, etc. to each other. In practice, similar concepts may be applied to other types of network elements, such as CUs, NFs, virtual machines, containers, Multi-Access/Mobile Edge Computing ("MECs") device, referred to sometimes herein simply as a "MECs," or the like. Further, similar concepts may be applied to different combinations of network elements, such as DUs that communicate with CUs (e.g., DUs may propagate granular configuration into to CUs or vice versa), or any other suitable combination of network elements that are capable of communicating with each other.

Figure 12:
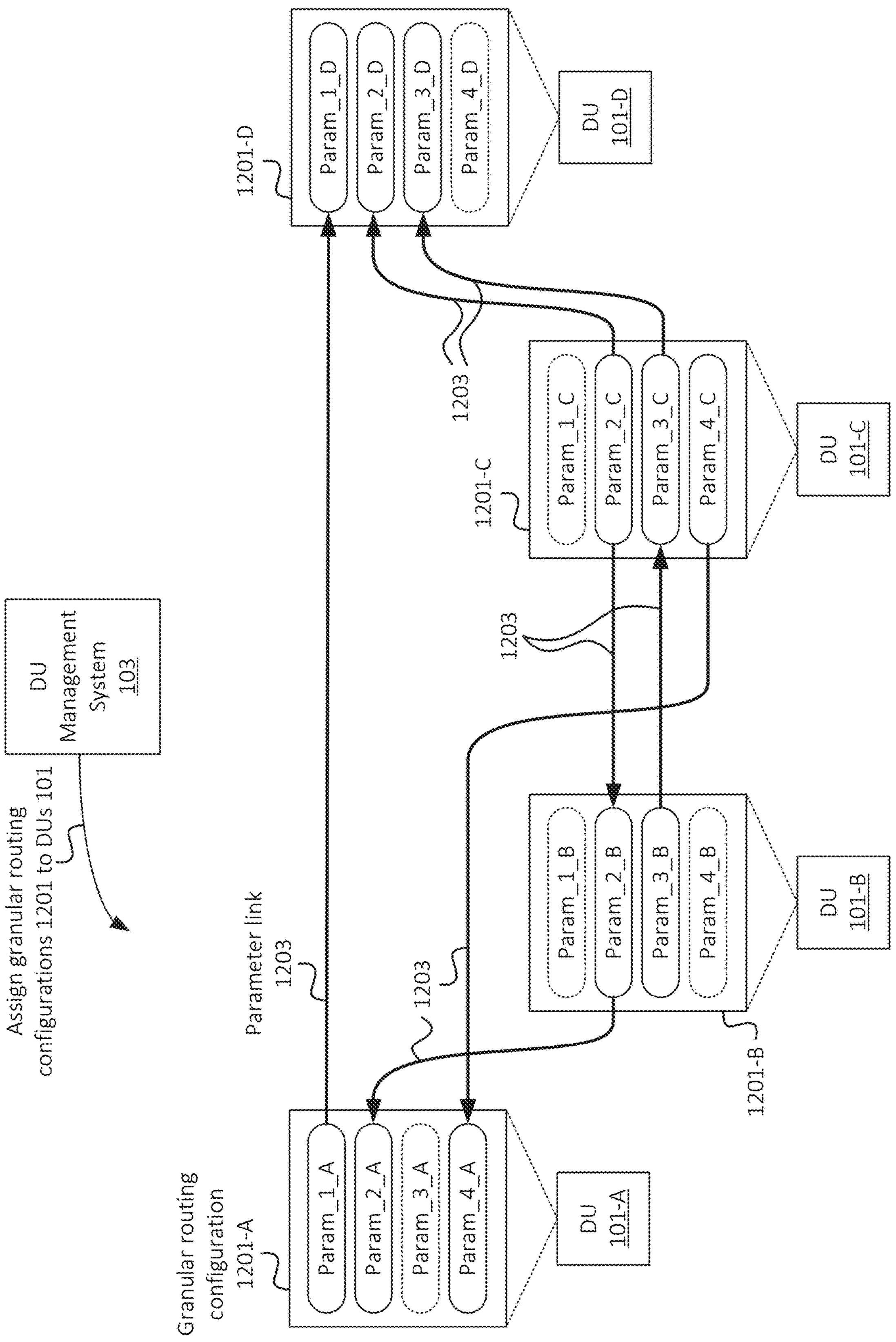
FIGS. 12 and 13 illustrate an example overview of a granular routing configuration between elements of a wireless network, in accordance with some embodiments.

As shown in FIG. 12, for example, DMS 103 may assign granular routing configurations 1201 to DUs 101 of a wireless network. In the examples provided herein, different granular routing configurations 1201 are assigned to different DUs 101 for purposes of explanation. For example, granular routing configuration 1201-A may be assigned to DU 101-A (e.g., DU 101-A may receive, install, etc. granular routing configuration 1201-A), granular routing configuration 1201-B may be assigned to DU 101-B, granular routing configuration 1201-C may be assigned to DU 101-C, and granular routing configuration 1201-D may be assigned to DU 101-D. In practice, granular routing configurations 1201 may be provided to DUs 101 on a per-DU group basis (e.g., multiple DUs 101 in a given group may receive the same granular routing configuration 1201), or on some other suitable basis.

Each granular routing configuration 1201 may include one or more parameters and/or values for such parameters. Such parameters and/or associated values may relate to configuration information for each respective DU 101. For example, the parameters may include QoS parameters (e.g., latency thresholds, throughput thresholds, SLAs, or the like), access policy parameters (e.g., information specifying conditions or criteria based on whether to provide access to a service provided by DU 101), and/or other suitable types of parameters. The parameters may be identified in accordance with APIs, software development kits ("SDKs"), firmware, applications, or the like that are implemented by respective DUs 101. Further, values for such parameters may be identified by DMS 103 using AI/ML techniques, based on preferences or configuration settings provided by a network operator associated with DMS 103, etc.

In this example, for instance, each DU 101 implements at least the following four example parameters: "Param_1," "Param_2," "Param_3," and "Param_4." Thus, as shown in FIG. 12, "Param_1_A" refers to "Param_1" and a particular value for this parameter as configured for DU 101-A, "Param_1_B" refers to the same "Param_1" and another particular value for this parameter as configured for DU 101-B, and so on.

In accordance with some embodiments, one or more parameters for a given DU 101 may be linked to another parameter for another DU 101, as represented by parameter links 1203. Parameter links 1203 conceptually represent respective parameters which, when updated or otherwise modified at one DU 101, should be propagated to one or more other DUs 101. In this sense, parameter links 1203 may be used to implement granular routing paths for forwarding, propagating, etc. updates to particular parameters at particular DUs 101.

For example, a granular routing path for Param_2 may include, when Param_2 (or, specifically, Param_2_C) is updated at DU 101-C, Param_2_A may be automatically updated at DU 101-A, Param_2_B may be automatically updated at DU 101-B, and Param_2_D may be automatically updated at DU 101-D. Specifically, for example, DU 101-C may propagate the updated value for Param_2 to DUs 101-D and 101-B, and DU 101-B may propagate the updated value for Param_2 to DU 101-A.

For the sake of simplicity of explanation, examples are provided herein in the context of values for particular parameters being propagated for the same parameters (e.g., synchronizing or propagating an updated value for Param_2, in the example above). In practice, similar concepts may apply for values for parameters being propagated for different parameters. For example, one or more granular routing configurations 1201 may specify that when a value is updated for a given parameter at a first DU 101, the same value should be updated for a different parameter at a second DU 101.

Further, while examples are provided herein in the context of the same value being propagated between DUs 101 (e.g., an updated value being propagated in accordance with a granular routing path, as discussed above), granular routing configurations 1201 may specify operations, computations, etc. to perform prior to propagating a value. For example, a given granular routing configuration 1201 may specify that when a value is updated for a given parameter at a given DU 101, one or more operations (e.g., mathematical operations, cryptography operations, etc.) should be performed to compute a new value, and that the value should be propagated to one or more other DUs 101.

In some embodiments, propagating updated values may include "pushing" the values to one or more other DUs 101. For example, assume that Param_2_C is updated at DU 101-C, where such update may be based on an update from DMS 103, based on internal processing such as AI/ML techniques performed by DU 101-C, based on DU 101-C identifying that one or more policies are satisfied, and/or by some other suitable mechanism. In some embodiments, granular routing configurations 1201 maintained by DU 101-C and/or by DUs 101-B and 101-D may be used by DU 101-C to identify that the update should be provided to DUs 101-B and 101-D. DU 101-C may, for example, "push" the updated value for Param_2 (e.g., a value specified by Param_2_C) to DUs 101-B and 101-D, such as by using IP addresses and/or other suitable communication information of DUs 101-B and 101-D to propagate the updated value for Param_2.

Additionally, or alternatively, propagating updated values may include "pulling" the values from one or more DUs 101. For example, assume again that Param_2_C is updated at DU 101-C. DUs 101-B and 101-D may maintain granular routing configurations 1201 indicating that DUs 101-B and 101-D should periodically, intermittently, and/or on some other ongoing basis, check DU 101-C for updated values for Param_2. For example, DUs 101-B and 101-D may, on an ongoing basis, request, from DU 101-C, information indicating whether Param_2_C was updated and, if so, information specifying the updated value for Param_2_C.

In some scenarios, not all parameters for a given DU 101 may be configured to be propagated to or from other DUs 101. For example, as denoted by the dashed lines in the figure, Param_3_A, Param_1_B, Param_4_B, Param_1_C, and Param_4_D are not associated with any parameter links 1203 that indicate that these parameters are to be propagated to or received from other DUs 101. The granular routing and/or propagation of particular parameters of network elements (such as DUs 101, as provided for in the examples discussed herein) may provide for a greater level of control of the network elements, thus providing greater flexibility to improve aspects of the network such as bandwidth efficiency, QoS delivery, resource consumption, power consumption, user satisfaction, and the like.

Figure 13:
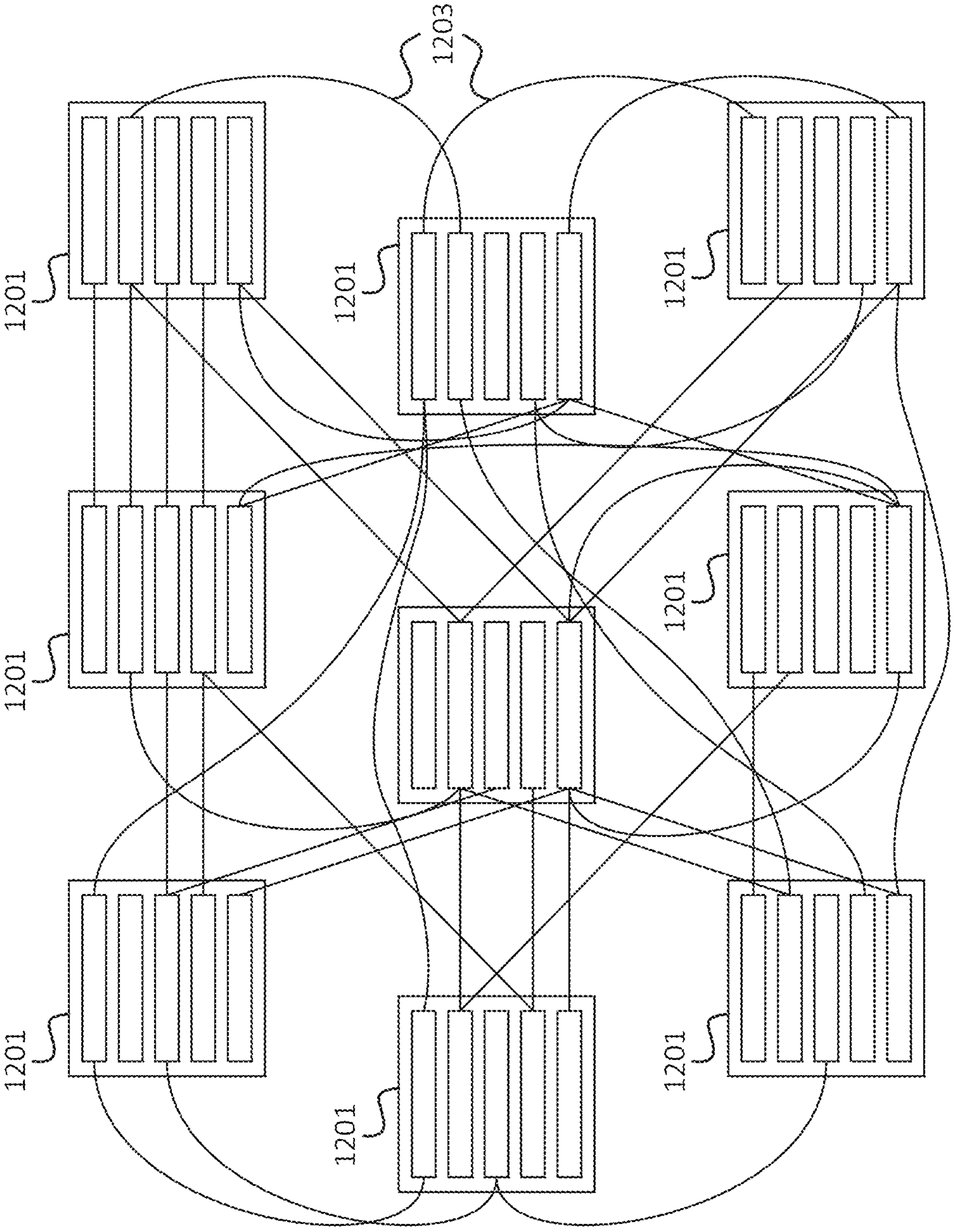

Additionally, as shown in FIG. 13, the configuration of granular routing paths between various network elements (e.g., as reflected in granular routing configurations 1201 and parameter links 1203 shown in this figure) may quickly become relatively complex and difficult to manage. As such, manual configuration of each network element may be unfeasible (e.g., configuring particular parameters at hundreds or thousands of network elements in a relatively short time), and the automated nature of embodiments provided for herein makes possible the granular configuration of such network elements in a manner that optimizes efficiency and operation of the network.

Figure 14:
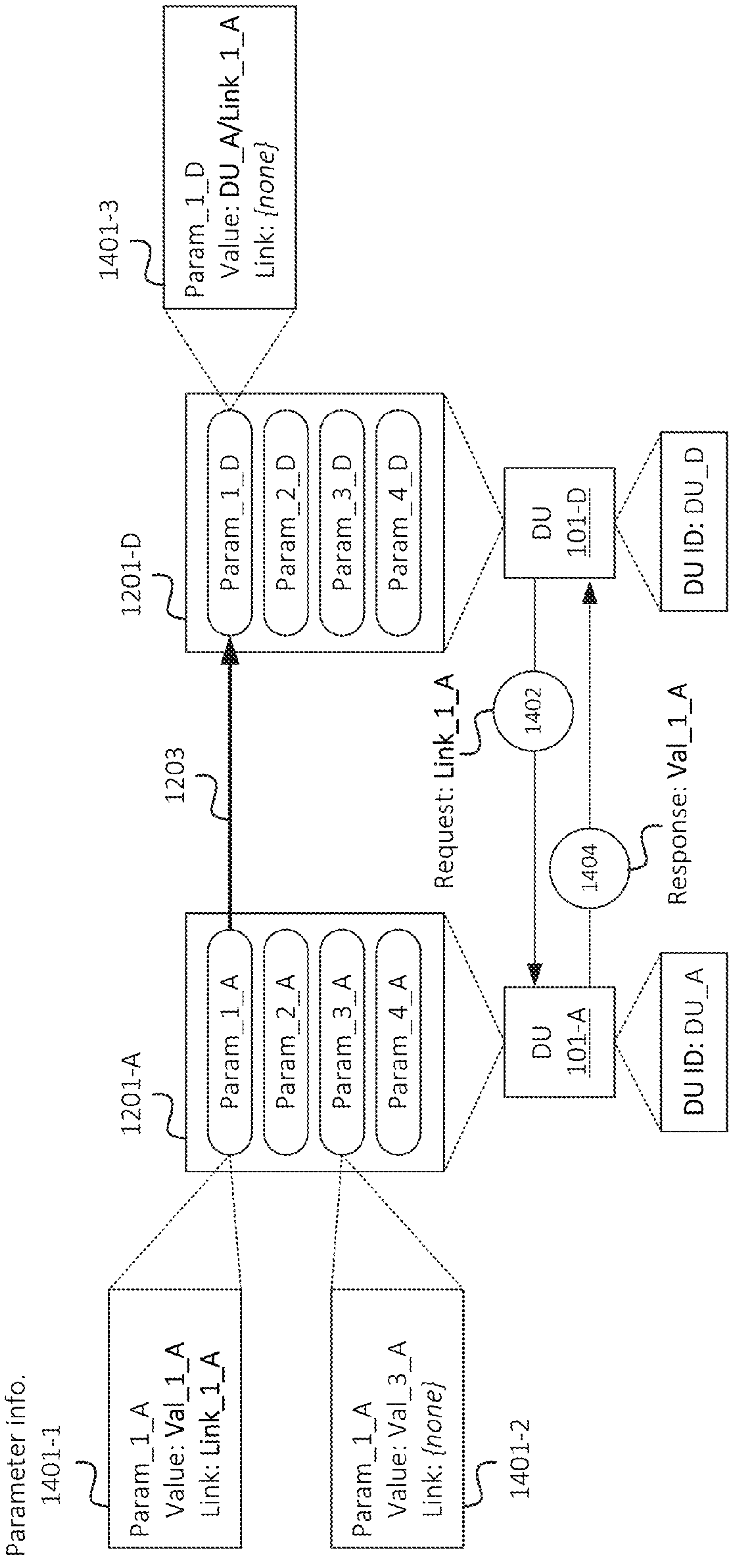
FIGS. 14 and 15 illustrate examples of linked parameters for different elements of a wireless network, in accordance with some embodiments.
Figure 15:
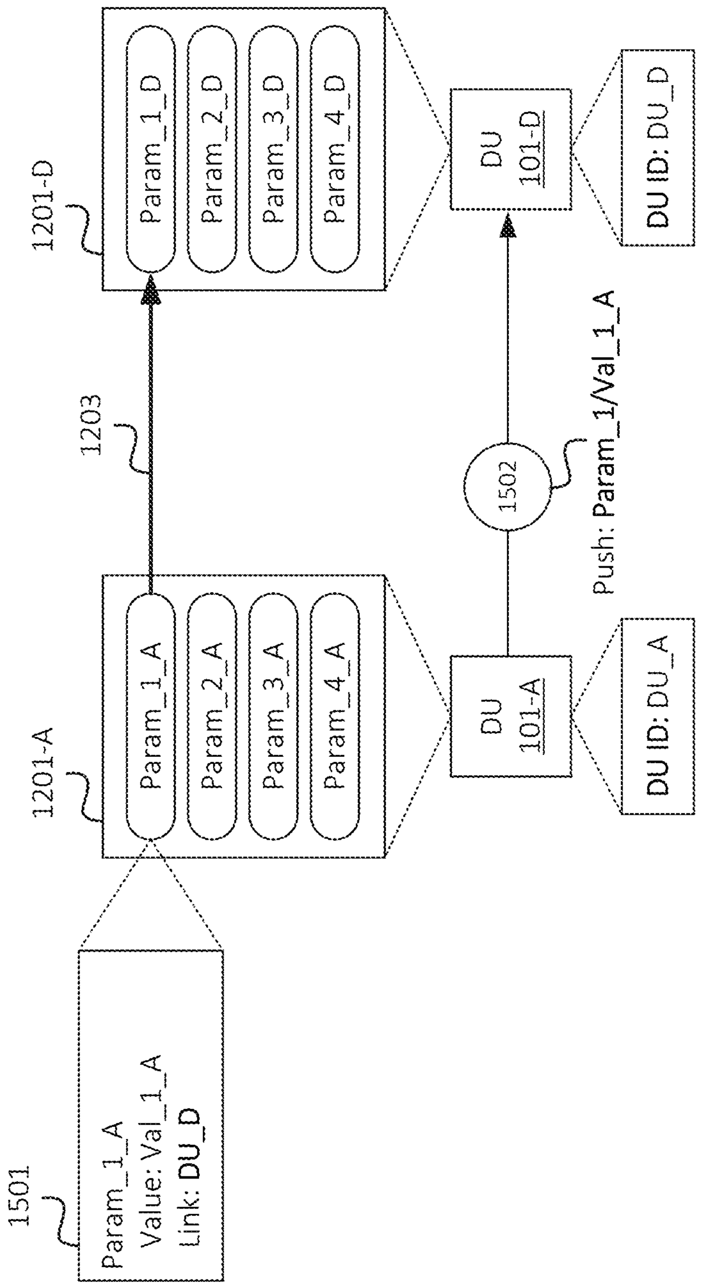

FIGS. 14 and 15 illustrate example arrangements of granular routing configuration 1201 that may be used to facilitate the automated routing and/or propagation of configuration updates discussed above. As shown in FIG. 14, granular routing configurations 1201 of some embodiments may include respective parameter information 1401 for some or all parameters for a given DU 101. For example, granular routing configuration 1201-A, associated with DU 101-A, may include parameter information 1401-1 for Param_1_A and parameter information 1401-2 for Param_3_A. In practice, granular routing configuration 1201-A may include additional parameter information 1401 for other parameters, while parameter information 1401-1 and 1401-2 are discussed here for the purposes of explanation. Similarly, granular routing configuration 1201-D may include parameter information 1401-3 for Param_1_D and may further include respective parameter information 1401 for other parameters.

In this example, parameter information 1401-1 may include a name or identifier of the parameter with which parameter information 1401-1 is associated ("Param_1_A" in this example), and a value for this parameter ("Val_1_A" in this example). In accordance with some embodiments, parameter information 1401-1 and/or 1401-3 may denote a particular parameter link 1203 between Param_1_A and Param_1_D. For example, parameter information 1401-1 may include a link, name, or other identifier which may be used by DU 101-A to identify requests for a value associated with Param_1_A (e.g., where a response to such a request may include providing Val_1_A). Parameter information 1401-3 may include, for Param_1_D, an indication that the value should be updated (e.g., on a periodic basis, an intermittent basis, and/or on some other ongoing basis) based on updates implemented at DU 101-A. For example, parameter information 1401-3 may denote that the value for Param_1_D should be obtained from DU 101-A (e.g., which may be associated with a particular identifier, IP address, etc. as denoted by "DU_A," as discussed above), and further that the value is associated with a link with the example identifier "Link_1_A."

DU 101-D may periodically, intermittently, on a policy or event-driven basis, etc. request, or "pull," (at 1402) the value associated with Link_1_A. In some embodiments, the request may include a Hypertext Transfer Protocol ("HTTP") request, such as an HTTP GET request, where DU 101-D is able to identify that the request should be forwarded to DU 101-A based on the identifier of DU 101-A in parameter information 1401-3 (e.g., "DU_A," in this example). DU 101-A may identify that Link_1_A corresponds to the value for Param_1_A (i.e., Val_1_A, in this example), and may provide (at 1404) a response with the requested value for Param_1_A (i.e., Val_1_A, in this example). DU 101-D may accordingly update locally maintained information, in which DU 101-D maintains information indicating a value associated with Param_1_D (e.g., granular routing configuration 1201-D and/or some other suitable data structure or data repository). That is, in some embodiments, DU 101-D may maintain both the linked value for Param_1_D (i.e., Val_1_A, in this example), as well as information denoting parameter link 1203 between Param_1_A and Param_1_D. In this manner, DU 101-D may be able to continue to monitor DU 101-A for updates to Param_1_A, and may request (at 1402) and receive (at 1404) such updates, in order to maintain up-to-date values for Param_1_D.

As shown in FIG. 15, parameter information 1501 for Param_1_A, as specified by granular routing configuration 1201-A, may include information indicating that updates to the value for Param_1, as maintained by DU 101-A, should be provided (e.g., pushed) to DU 101-D. For example, parameter information 1501, for Param_1_A, may include an IP address, an identifier, etc. of DU 101-D (e.g., represented as "DU_D"). In situations where the value for Param_1_A is updated (e.g., where Val_1_A is updated), DU 101-A may, based on the link information included in parameter information 1501, push (at 1502) the updated information to DU 101-D. For example, DU 101-A may indicate which parameter was updated (e.g., Param_1), as well as the updated value for the parameter (e.g., Val_1_A). In some embodiments, DU 101-D may update its respective value for Param_1 (e.g., Param_1_D) with the provided value. In some embodiments, DU 101-D may perform some other set of operations based on the provided value, such as deriving a new value using one or more operations, updating a different parameter, etc. As noted above, such other set of operations may be specified by granular routing configuration 1201-D and/or other suitable information maintained by DU 101-D.

FIGS. 14 and 15 illustrate example arrangements of parameter information (e.g., parameter information 1401 and/or 1501) that may be used to implement parameter links 1203 (e.g., the automated propagation of updated parameter information). In practice, some embodiments may incorporate other types of arrangements or mechanisms in order to synchronize and/or propagate parameter information between network elements, in accordance with granular routing configurations 1201 associated with such parameters and/or network elements.

Figure 16:
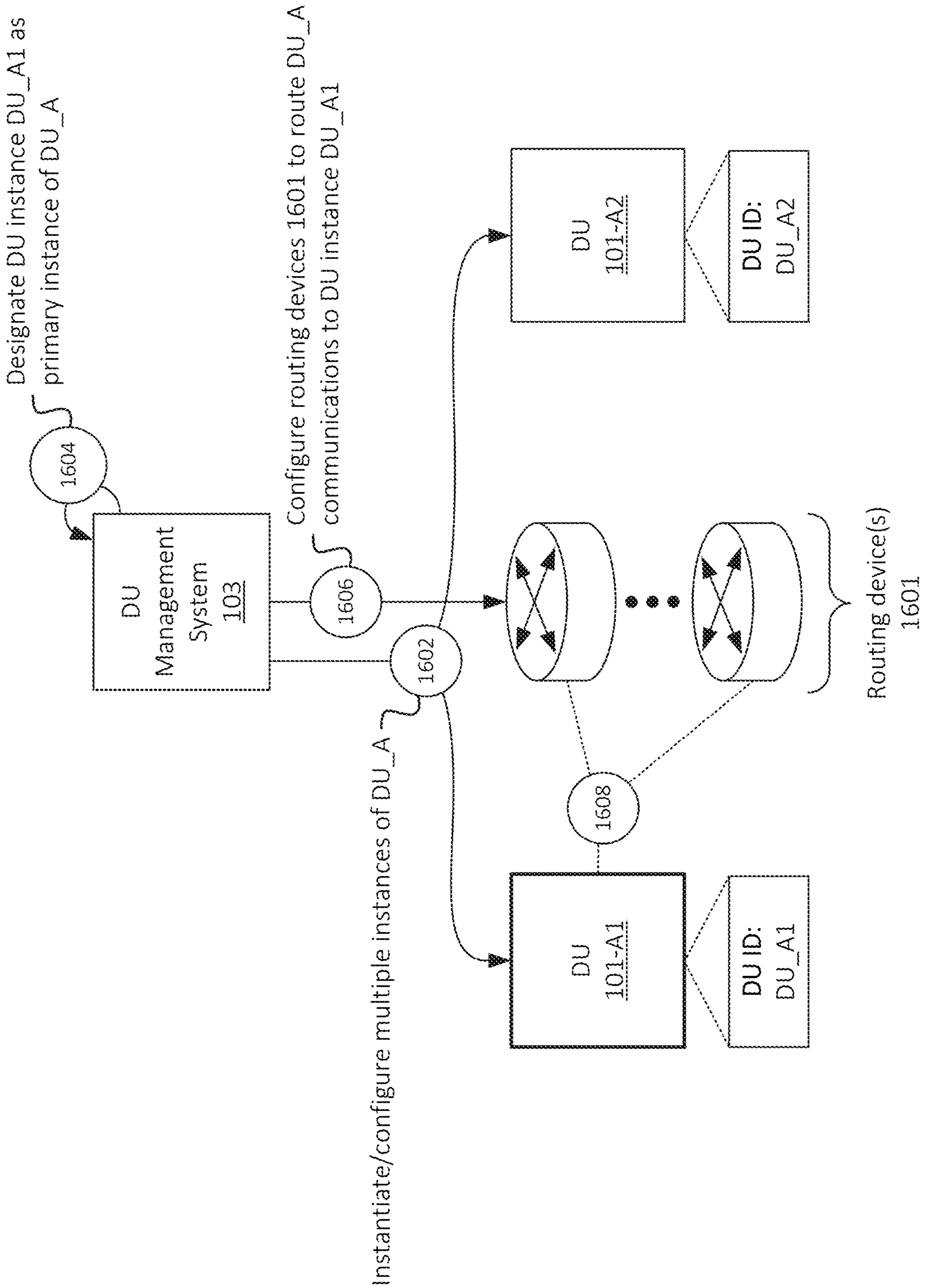
FIGS. 16 and 17 illustrate an example of a fast switch operation for an element of a wireless network and the ensuing automatic propagation of parameters of the network element, in accordance with some embodiments.
Figure 17:
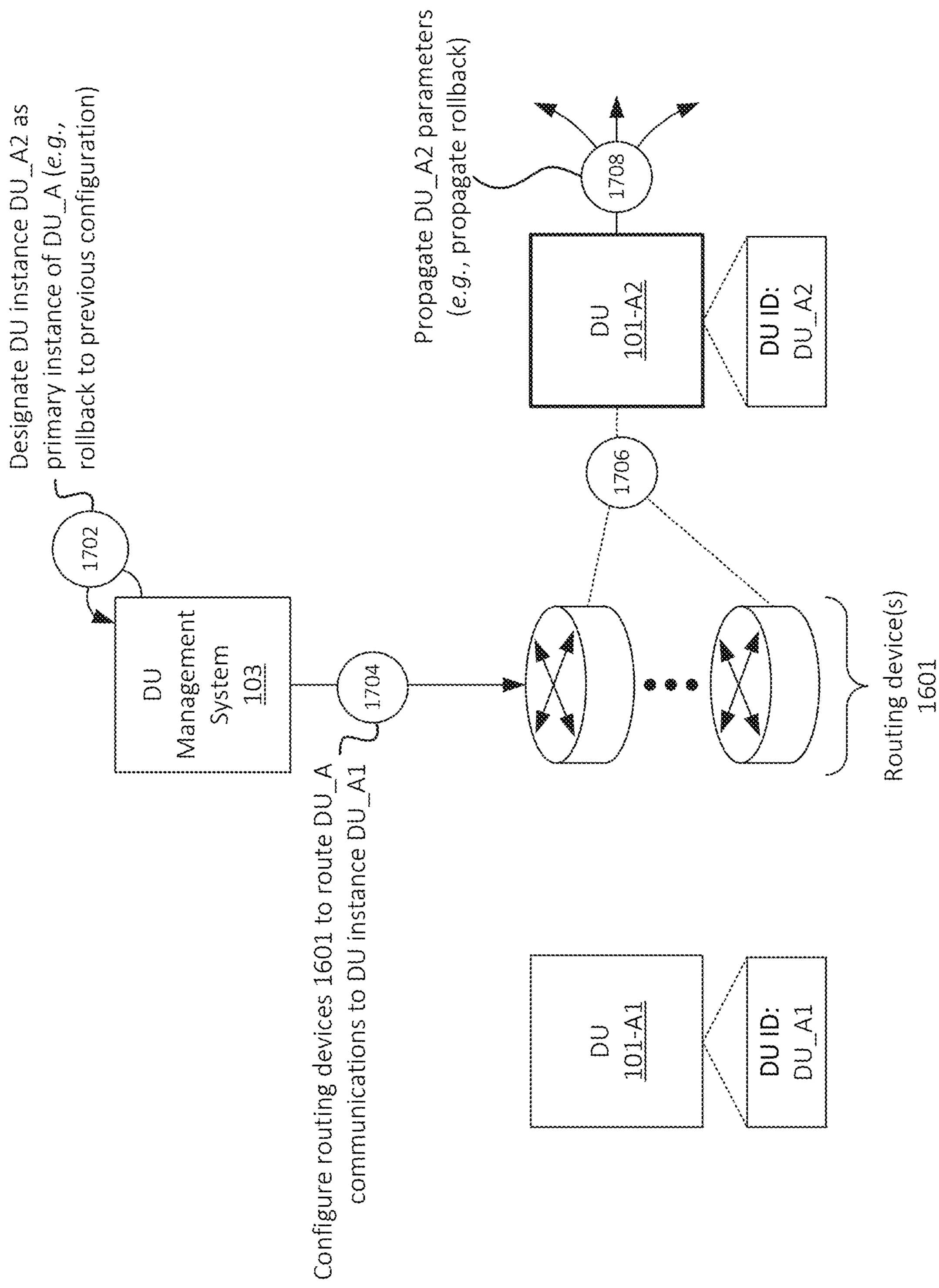

FIGS. 16 and 17 illustrate an example fast switch mechanism that may be implemented in accordance with some embodiments. As shown, DMS 103 may instantiate and/or configure (at 1602) multiple instances of a particular DU 101, such as instances 101-A1 (e.g., a first instance) and 101-A2 of DU 101. Instances 101-A1 and 101-A2 may, for example, be implemented by containers, virtual machines, images, or the like in a virtualization and/or containerization environment.

DMS 103 may, in some scenarios, instantiate and/or configure instances 101-A1 and 101-A2 at the same time, such as during an initial configuration procedure. Additionally, or alternatively, DMS 103 may instantiate and/or configure instances 101-A1 and 101-A2 at different times, such as when providing an update to DU instance 101-A1. For example, DMS 103 may have instantiated DU instance 101-A1 at a particular time, and may later (e.g., after a few days, hours, weeks, etc.) output an update for one or more parameters associated with the first instance 101-A1. As part of the update procedure, DMS 103 may instantiate the second instance 101-A2 as a "fallback" in case the update to instance 101-A1 causes performance issues, reliability issues, or is otherwise desired to be rolled back to a previous configuration. For example, instance 101-A2 may be configured with parameters implemented by instance 101-A1 prior to an update. In some embodiments, instance 101-A2 may be instantiated in a low-power or low-communication mode (e.g., in which communications directed to DU 101-A are provided to instance 101-A1 but not to instance 101-A2). DMS 103 may accordingly designate and/or maintain (at 1604) information indicating that instance 101-A1 is a primary instance of DU 101-A. For example, DMS 103 may associate instance 101-A1 with an identifier, an IP address, etc. (denoted as "DU_A1"), and may further maintain routing or mapping information indicating that communications associated with the identifier for DU 101-A (e.g., DU_A) should be routed to the particular instance 101-A1 having the identifier DU_A1.

DMS 103 may accordingly configure (at 1606) one or more routing devices 1601, via which instances 101-A1 and/or 101-A2 are able to send and receive network traffic, with information associating the identifier for DU 101-A (i.e., DU_A in this example) with the identifier for instance 101-A1. As such, routing devices 1601 may route (at 1608) traffic, with a specified destination of DU 101-A (e.g., with an IP address or other identifier denoted by the example identifier DU_A), to instance 101-A1.

As shown in FIG. 17, at some point in time, DMS 103 may designate (at 1702) instance 101-A2 as the primary instance of DU 101-A. For example, DMS 103 may determine that a configuration update, implemented at instance 101-A1, should be rolled back to a previous configuration (e.g., where instance 101-A2 has been configured with the previous configuration). In some embodiments, DMS 103 may output a notification to instances 101-A1 and/or 101-A2, indicating that instance 101-A2 has been designated as the primary instance of DU 101-A. In some embodiments, in response to receiving such a notification, instance 101-A2 may exit a low-power and/or low-communication mode. Additionally, or alternatively, instance 101-A1 may enter a low-power and/or low-communication mode based on receiving a notification that instance 101-A1 is no longer a primary instance of DU 101-A.

DMS 103 may further configure (at 1704) routing devices 1601 to route traffic, indicating the identifier for DU 101-A (e.g., DU_A) should be routed to the particular instance 101-A2 having the identifier DU_A2. In this manner, instance 101-A2 may become the instance of DU 101-A that provides services associated with such traffic. Accordingly, routing devices 1601 may proceed to route (at 1706) communications, associated with DU 101-A, to instance 101-A2 (e.g., instead of to instance 101-A1).

In some embodiments, based on the fast switch to instance 101-A2 from instance 101-A1, parameters implemented by instance 101-A2 may be propagated (at 1708) in accordance with one or more granular routing configurations 1201 (e.g., as maintained by instance 101-A2 and/or other DUs 101). For example, other DUs 101 may "pull" values for particular attributes, and/or instance 101-A2 may "push" values for particular attributes to one or more other DUs 101, as discussed above. In this manner, the fast switch of one instance to another may trigger not only the switching of configuration information for a particular network element or instance thereof, but may also trigger an automatic cascading propagation (e.g., on a per-parameter basis) of one or more parameters specified in such configuration information to other network elements, thus reducing the complexity and laboriousness of implementing granular updates or rollbacks across a numerous amount of network elements in the network.

Figure 18:
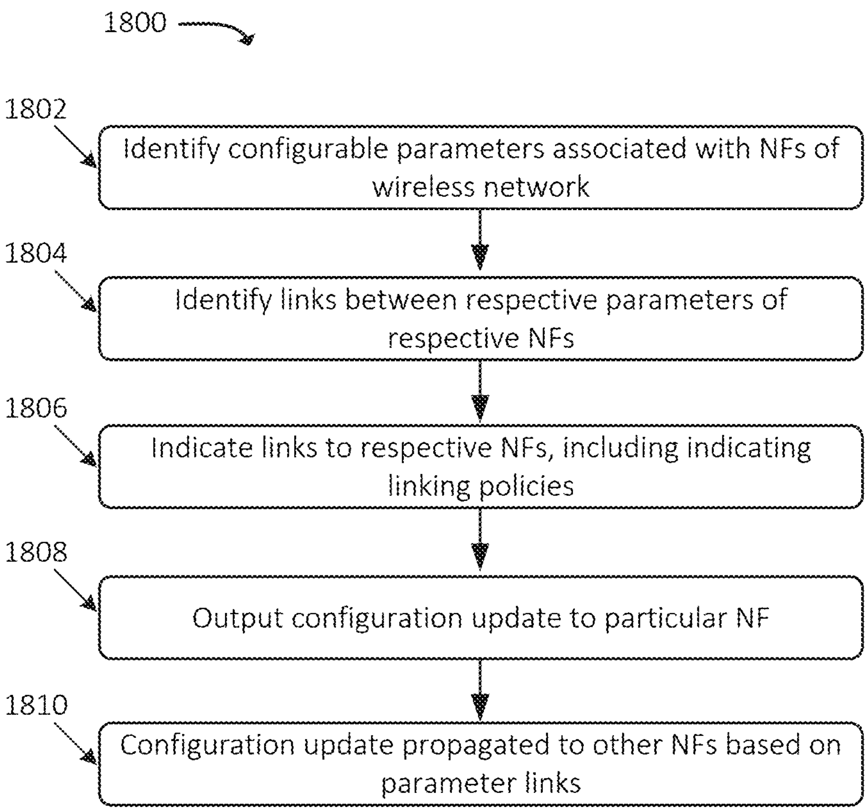
FIG. 18 illustrates an example process for granular parameter routing in a wireless network, in accordance with some embodiments.

FIG. 18 illustrates an example process 1800 for granular parameter routing in a wireless network, in accordance with some embodiments. In some embodiments, some or all of process 1800 may be performed by DMS 103. In some embodiments, one or more other devices may perform some or all of process 1800 in concert with, and/or in lieu of, DMS 103. As noted above, examples above were provided in the context of the configuration of DUs 101 of a wireless network. In practice, and as described with respect to FIG. 18, similar operations may be performed with respect to any suitable type of NF of a wireless network. For example, a configuration system, a network management system, or the like may perform some or all of the operations of process 1800.

As shown, process 1800 may include identifying (at 1802) configurable parameters associated with NFs of a wireless network. For example, as discussed above, DMS 103 and/or some other suitable device or system (e.g., a network management system) may identify parameters of respective NFs that may be configured in order to provide optimal or efficient operation of the network, which may include optimizing the use of network resources, delivering optimal QoS to devices or users that communicate via the network, etc. In some embodiments, values for the parameters may be generated or determined using AI/ML techniques or other suitable techniques.

Process 1800 may further include identifying (at 1804) links between respective parameters of respective NFs. For example, DMS 103 may identify particular NFs that are located in the same region, that provide the same service, that communicate with the same set of UEs, NFs with the same or similar hardware attributes, sets of NFs that are in one or more particular routing paths, NFs associated with the same network slice, etc. DMS 103 may identify, using AI/ML techniques or other automated techniques (and/or may receive selections, policies, criteria, etc. from an operator of the network or some other source), particular parameters of respective NFs that should be synchronized, propagated, etc. As discussed above, parameter links 1203 may be identified or determined in a manner that reduces the amount of messaging or network bandwidth consumption needed from DMS 103 in order to output configuration updates (e.g., granular routing paths may be used to propagate granular, per-parameter configuration updates to numerous NFs without DMS 103 needing to individually communicate with each NF). Additionally, or alternatively, parameter links 1203 may be identified or determined in a manner that optimizes the operation of the network in one or more ways, such as improving QoS, reducing network resource consumption, etc.

Process 1800 may additionally include indicating (at 1806) the parameter links to some or all of the NFs. For example, in some embodiments, DMS 103 may output one or more granular routing configurations 1201 to some or all of the NFs of the network. As discussed above, granular routing configurations 1201 may indicate parameter links 1203 between respective parameters of respective NFs of the network. Granular routing configurations 1201 may also indicate linking policies, such as whether a given NF should "push" or "pull" updated information associated with respective parameters. In some embodiments, the linking policies may indicate when an NF should "push" or "pull" updated information associated with such parameters, such as every minute, every hour, upon the occurrence of one or more particular triggering events, etc.

Process 1800 may also include outputting (at 1808) a configuration update to a particular NF. For example, DMS 103 may determine one or more updated values for one or more NFs using AI/ML techniques or other suitable techniques (e.g., based on monitoring or identifying Key Performance Indicators ("KPIs") associated with the network such as performance metrics, QoS metrics, reliability metrics, etc., and may output the updated values to a given NF. For instance, DMS 103 may identify that a particular parameter, for a set of NFs that are associated with a particular granular routing path, should be updated. Referring to the example of FIG. 12, DMS 103 may identify, for example, that Param_2 should be updated at DUs 101-A, 101-B, 101-C, and 101-D. As similarly noted above, DMS 103 may identify that DU 101-C is a configuration gateway with respect to Param_2 (e.g., according to granular routing configurations 1201 implemented by DUs 101-A, 101-B, 101-C, and 101-D). For example, an update to Param_2_C, as provided to DU 101-C, would ultimately also be provided to DUs 101-A, 101-B, and 101-D. DMS 103 may accordingly provide the configuration update to DU 101-C, in this example, in order for Param_2 to be updated at all of DUs 101-A, 101-B, 101-C, and 101-D. For example, DU 101-C may propagate (at 1810) the configuration update for Param_2 to DUs 101-B and 101-D, and DU 101-B may further propagate the configuration update for Param_2 to DU 101-A.

Figure 19:
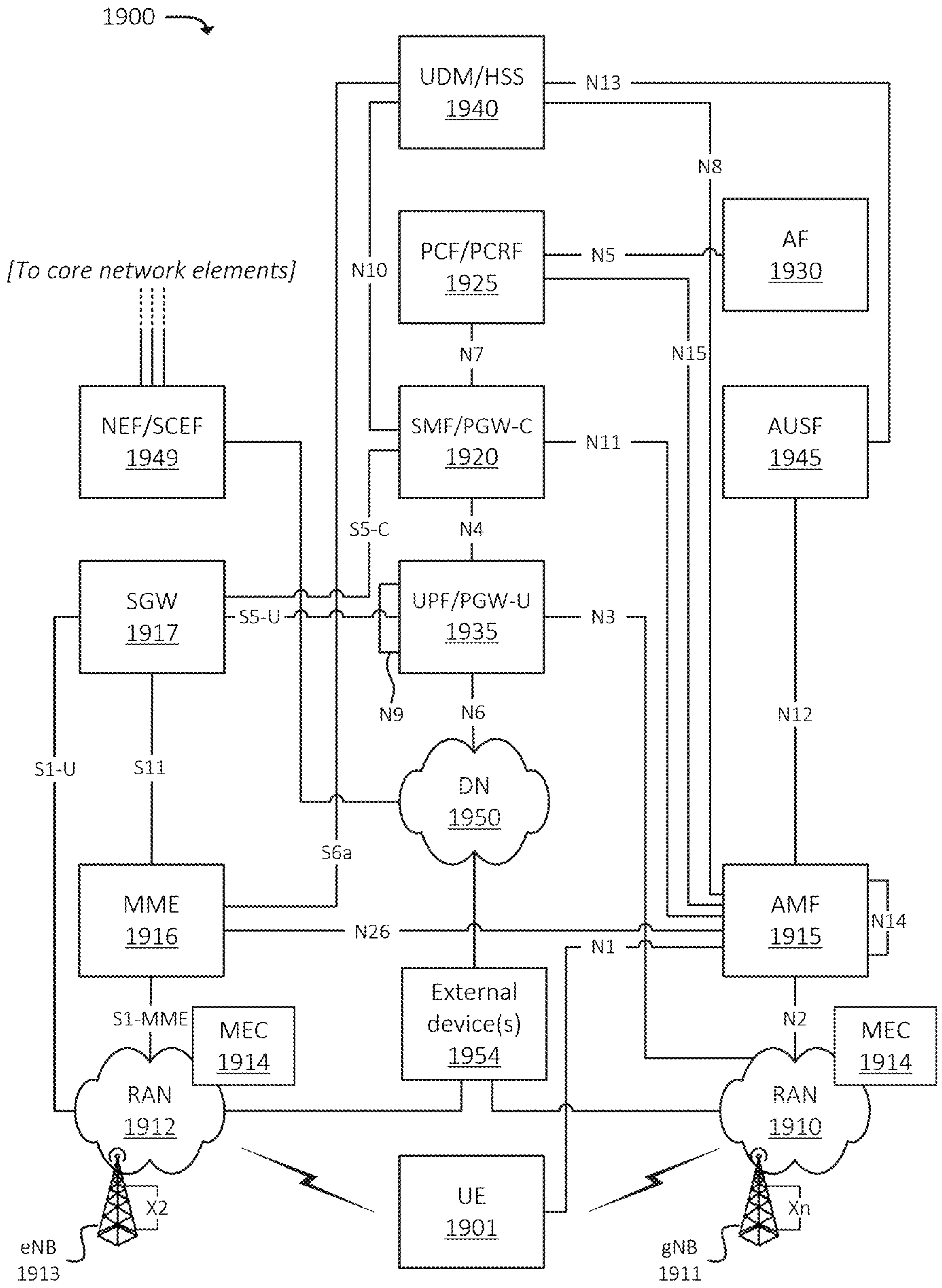
FIGS. 19 and 20 illustrate example environments in which one or more embodiments, described herein, may be implemented.

FIG. 19 illustrates an example environment 1900, in which one or more embodiments may be implemented. In some embodiments, environment 1900 may correspond to a Fifth Generation ("5G") network, and/or may include elements of a 5G network. In some embodiments, environment 1900 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 1900 may represent or may include a 5G core ("5GC"). As shown, environment 1900 may include UE 1901, RAN 1910 (which may include one or more Next Generation Node Bs ("gNBs") 1911), RAN 1912 (which may include one or more evolved Node Bs ("eNBs") 1913), and various network functions such as AMF 1915, MME 1916, Serving Gateway ("SGW") 1917, Session Management Function ("SMF")/Packet Data Network ("PDN") Gateway ("PGW")-Control plane function ("PGW-C") 1920, Policy Control Function ("PCF")/Policy Charging and Rules Function ("PCRF") 1925, Application Function ("AF") 1930, User Plane Function ("UPF")/PGW-User plane function ("PGW-U") 1935, Unified Data Management ("UDM")/Home Subscriber Server ("HSS") 1940, Authentication Server Function ("AUSF") 1945, and Network Exposure Function ("NEF")/Service Capability Exposure Function ("SCEF") 1949. Environment 1900 may also include one or more networks, such as Data Network ("DN") 1950. Environment 1900 may include one or more additional devices or systems communicatively coupled to one or more networks (e.g., DN 1950), such as one or more external devices 1954.

The example shown in FIG. 19 illustrates one instance of each network component or function (e.g., one instance of SMF/PGW-C 1920, PCF/PCRF 1925, UPF/PGW-U 1935, UDM/HSS 1940, and/or AUSF 1945). In practice, environment 1900 may include multiple instances of such components or functions. For example, in some embodiments, environment 1900 may include multiple "slices" of a core network, where each slice includes a discrete and/or logical set of network functions (e.g., one slice may include a first instance of AMF 1915, SMF/PGW-C 1920, PCF/PCRF 1925, and/or UPF/PGW-U 1935, while another slice may include a second instance of AMF 1915, SMF/PGW-C 1920, PCF/PCRF 1925, and/or UPF/PGW-U 1935). The different slices may provide differentiated levels of service, such as service in accordance with different QoS parameters.

The quantity of devices and/or networks, illustrated in FIG. 19, is provided for explanatory purposes only. In practice, environment 1900 may include additional devices and/or networks, fewer devices and/or networks, different devices and/or networks, or differently arranged devices and/or networks than illustrated in FIG. 19. For example, while not shown, environment 1900 may include devices that facilitate or enable communication between various components shown in environment 1900, such as routing devices 1601 (e.g., routers, modems, gateways, switches, hubs, etc.). In some implementations, one or more devices of environment 1900 may be physically integrated in, and/or may be physically attached to, one or more other devices of environment 1900. Alternatively, or additionally, one or more of the devices of environment 1900 may perform one or more network functions described as being performed by another one or more of the devices of environment 1900.

Additionally, one or more elements of environment 1900 may be implemented in a virtualized and/or containerized manner. For example, one or more of the elements of environment 1900 may be implemented by one or more Virtualized Network Functions ("VNFs"), Cloud-Native Network Functions ("CNFs"), etc. In such embodiments, environment 1900 may include, may implement, and/or may be communicatively coupled to an orchestration platform that provisions hardware resources, installs containers or applications, performs load balancing, and/or otherwise manages the deployment of such elements of environment 1900. In some embodiments, such orchestration and/or management of such elements of environment 1900 may be performed by, or in conjunction with, the open-source Kubernetes® API or some other suitable virtualization, containerization, and/or orchestration system.

Elements of environment 1900 may interconnect with each other and/or other devices via wired connections, wireless connections, or a combination of wired and wireless connections. Examples of interfaces or communication pathways between the elements of environment 1900, as shown in FIG. 19, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 19, such as Service-Based Interfaces ("SBIs"), including an Namf interface, an Nudm interface, an Npcf interface, an Nupf interface, an Nnef interface, an Nsmf interface, and/or one or more other SBIs.

UE 1901 may include a computation and communication device, such as a wireless mobile communication device that is capable of communicating with RAN 1910, RAN 1912, and/or DN 1950. UE 1901 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a programmable logic controller or other industrial controller, a Machine-to-Machine ("M2M") device, or the like), a Fixed Wireless Access ("FWA") device, or another type of mobile computation and communication device. UE 1901 may send traffic to and/or receive traffic (e.g., user plane traffic) from DN 1950 via RAN 1910, RAN 1912, and/or UPF/PGW-U 1935.

RAN 1910 may be, or may include, a 5G RAN that implements a 5G RAT and that includes one or more base stations (e.g., one or more gNBs 1911), via which UE 1901 may communicate with one or more other elements of environment 1900. UE 1901 may communicate with RAN 1910 via an air interface (e.g., as provided by gNB 1911). For instance, RAN 1910 may receive traffic (e.g., user plane traffic such as voice call traffic, data traffic, messaging traffic, etc.) from UE 1901 via the air interface, and may communicate the traffic to UPF/PGW-U 1935 and/or one or more other devices or networks. Further, RAN 1910 may receive signaling traffic, control plane traffic, etc. from UE 1901 via the air interface, and may communicate such signaling traffic, control plane traffic, etc. to AMF 1915 and/or one or more other devices or networks. Additionally, RAN 1910 may receive traffic intended for UE 1901 (e.g., from UPF/PGW-U 1935, AMF 1915, and/or one or more other devices or networks) and may communicate the traffic to UE 1901 via the air interface.

RAN 1912 may be, or may include, an LTE RAN that implements an LTE RAT and that includes one or more base stations (e.g., one or more eNBs 1913), via which UE 1901 may communicate with one or more other elements of environment 1900. UE 1901 may communicate with RAN 1912 via an air interface (e.g., as provided by eNB 1913). For instance, RAN 1912 may receive traffic (e.g., user plane traffic such as voice call traffic, data traffic, messaging traffic, signaling traffic, etc.) from UE 1901 via the air interface, and may communicate the traffic to UPF/PGW-U 1935 (e.g., via SGW 1917) and/or one or more other devices or networks. Further, RAN 1912 may receive signaling traffic, control plane traffic, etc. from UE 1901 via the air interface, and may communicate such signaling traffic, control plane traffic, etc. to MME 1916 and/or one or more other devices or networks. Additionally, RAN 1912 may receive traffic intended for UE 1901 (e.g., from UPF/PGW-U 1935, MME 1916, SGW 1917, and/or one or more other devices or networks) and may communicate the traffic to UE 1901 via the air interface.

One or more RANs of environment 1900 (e.g., RAN 1910 and/or RAN 1912) may include, may implement, and/or may otherwise be communicatively coupled to one or more edge computing devices, such as one or more MECs 1914. MECs 1914 may be co-located with wireless network infrastructure equipment of RANs 1910 and/or 1912 (e.g., one or more gNBs 1911 and/or one or more eNBs 1913, respectively). Additionally, or alternatively, MECs 1914 may otherwise be associated with geographical regions (e.g., coverage areas) of wireless network infrastructure equipment of RANs 1910 and/or 1912. In some embodiments, one or more MECs 1914 may be implemented by the same set of hardware resources, the same set of devices, etc. that implement wireless network infrastructure equipment of RANs 1910 and/or 1912. In some embodiments, one or more MECs 1914 may be implemented by different hardware resources, a different set of devices, etc. from hardware resources or devices that implement wireless network infrastructure equipment of RANs 1910 and/or 1912. In some embodiments, MECs 1914 may be communicatively coupled to wireless network infrastructure equipment of RANs 1910 and/or 1912 (e.g., via a high-speed and/or low-latency link such as a physical wired interface, a high-speed and/or low-latency wireless interface, or some other suitable communication pathway).

MECs 1914 may include hardware resources (e.g., configurable or provisionable hardware resources) that may be configured to provide services and/or otherwise process traffic to and/or from UE 1901, via RAN 1910 and/or 1912. For example, RAN 1910 and/or 1912 may route some traffic from UE 1901 (e.g., traffic associated with one or more particular services, applications, application types, etc.) to a respective MEC 1914 instead of to core network elements of environment 1900 (e.g., UPF/PGW-U 1935). MEC 1914 may accordingly provide services to UE 1901 by processing such traffic, performing one or more computations based on the received traffic, and providing traffic to UE 1901 via RAN 1910 and/or 1912. MEC 1914 may include, and/or may implement, some or all of the functionality described above with respect to UPF/PGW-U 1935, AF 1930, one or more application servers, and/or one or more other devices, systems, VNFs, CNFs, etc. In this manner, ultra-low latency services may be provided to UE 1901, as traffic does not need to traverse links (e.g., backhaul links) between RAN 1910 and/or 1912 and the core network.

AMF 1915 may include one or more devices, systems, VNFs, CNFs, etc., that perform operations to register UE 1901 with the 5G network, to establish bearer channels associated with a session with UE 1901, to hand off UE 1901 from the 5G network to another network, to hand off UE 1901 from the other network to the 5G network, to manage mobility of UE 1901 between RANs 1910 and/or gNBs 1911, and/or to perform other operations. In some embodiments, the 5G network may include multiple AMFs 1915, which communicate with each other via the N14 interface (denoted in FIG. 19 by the line marked "N14" originating and terminating at AMF 1915).

MME 1916 may include one or more devices, systems, VNFs, CNFs, etc., that perform operations to register UE 1901 with the EPC, to establish bearer channels associated with a session with UE 1901, to hand off UE 1901 from the EPC to another network, to hand off UE 1901 from another network to the EPC, to manage mobility of UE 1901 between RANs 1912 and/or eNBs 1913, and/or to perform other operations.

SGW 1917 may include one or more devices, systems, VNFs, CNFs, etc., that aggregate traffic received from one or more eNBs 1913 and send the aggregated traffic to an external network or device via UPF/PGW-U 1935. Additionally, S G W 1917 may aggregate traffic received from one or more UPF/PGW-Us 1935 and may send the aggregated traffic to one or more eNBs 1913. SGW 1917 may operate as an anchor for the user plane during inter-eNB handovers and as an anchor for mobility between different telecommunication networks or RANs (e.g., RANs 1910 and 1912).

SMF/PGW-C 1920 may include one or more devices, systems, VNFs, CNFs, etc., that gather, process, store, and/or provide information in a manner described herein. SMF/PGW-C 1920 may, for example, facilitate the establishment of communication sessions on behalf of UE 1901. In some embodiments, the establishment of communication sessions may be performed in accordance with one or more policies provided by PCF/PCRF 1925.

PCF/PCRF 1925 may include one or more devices, systems, VNFs, CNFs, etc., that aggregate information to and from the 5G network and/or other sources. PCF/PCRF 1925 may receive information regarding policies and/or subscriptions from one or more sources, such as subscriber databases and/or from one or more users (such as, for example, an administrator associated with PCF/PCRF 1925).

AF 1930 may include one or more devices, systems, VNFs, CNFs, etc., that receive, store, and/or provide information that may be used in determining parameters (e.g., quality of service parameters, charging parameters, or the like) for certain applications.

UPF/PGW-U 1935 may include one or more devices, systems, VNFs, CNFs, etc., that receive, store, and/or provide data (e.g., user plane data). For example, UPF/PGW-U 1935 may receive user plane data (e.g., voice call traffic, data traffic, etc.), destined for UE 1901, from DN 1950, and may forward the user plane data toward UE 1901 (e.g., via RAN 1910, SMF/PGW-C 1920, and/or one or more other devices). In some embodiments, multiple instances of UPF/PGW-U 1935 may be deployed (e.g., in different geographical locations), and the delivery of content to UE 1901 may be coordinated via the N9 interface (e.g., as denoted in FIG. 19 by the line marked "N9" originating and terminating at UPF/PGW-U 1935). Similarly, UPF/PGW-U 1935 may receive traffic from UE 1901 (e.g., via RAN 1910, RAN 1912, SMF/PGW-C 1920, and/or one or more other devices), and may forward the traffic toward DN 1950. In some embodiments, UPF/PGW-U 1935 may communicate (e.g., via the N4 interface) with SMF/PGW-C 1920, regarding user plane data processed by UPF/PGW-U 1935.

UDM/HSS 1940 and AUSF 1945 may include one or more devices, systems, VNFs, CNFs, etc., that manage, update, and/or store, in one or more memory devices associated with AUSF 1945 and/or UDM/HSS 1940, profile information associated with a subscriber. In some embodiments, UDM/HSS 1940 may include, may implement, may be communicatively coupled to, and/or may otherwise be associated with some other type of repository or database, such as a Unified Data Repository ("UDR"). AUSF 1945 and/or UDM/HSS 1940 may perform authentication, authorization, and/or accounting operations associated with one or more UEs 1901 and/or one or more communication sessions associated with one or more UEs 1901.

DN 1950 may include one or more wired and/or wireless networks. For example, DN 1950 may include an IP-based PDN, a wide area network ("WAN") such as the Internet, a private enterprise network, and/or one or more other networks. UE 1901 may communicate, through DN 1950, with data servers, other UEs 1901, and/or other servers or applications that are coupled to DN 1950. DN 1950 may be connected to one or more other networks, such as a public switched telephone network ("PSTN"), a public land mobile network ("PLMN"), and/or another network. DN 1950 may be connected to one or more devices, such as content providers, applications, web servers, and/or other devices, with which UE 1901 may communicate.

External devices 1954 may include one or more devices or systems that communicate with UE 1901 via DN 1950 and one or more elements of environment 1900 (e.g., via UPF/PGW-U 1935). In some embodiments, external devices 1954 may include, may implement, and/or may otherwise be associated with DMS 103. External devices 1954 may include, for example, one or more application servers, content provider systems, web servers, or the like. External devices 1954 may, for example, implement "server-side" applications that communicate with "client-side" applications executed by UE 1901. External devices 1954 may provide services to UE 1901 such as gaming services, videoconferencing services, messaging services, email services, web services, and/or other types of services.

In some embodiments, external devices 1954 may communicate with one or more elements of environment 1900 (e.g., core network elements) via NEF/SCEF 1949. NEF/SCEF 1949 may include one or more devices, systems, VNFs, CNFs, etc. that provide access to information, APIs, and/or other operations or mechanisms of one or more core network elements to devices or systems that are external to the core network (e.g., to external device 1954 via DN 1950). NEF/SCEF 1949 may maintain authorization and/or authentication information associated with such external devices or systems, such that NEF/SCEF 1949 is able to provide information, that is authorized to be provided, to the external devices or systems. For example, a given external device 1954 may request particular information associated with one or more core network elements. NEF/SCEF 1949 may authenticate the request and/or otherwise verify that external device 1954 is authorized to receive the information, and may request, obtain, or otherwise receive the information from the one or more core network elements. In some embodiments, NEF/SCEF 1949 may include, may implement, may be implemented by, may be communicatively coupled to, and/or may otherwise be associated with a Security Edge Protection Proxy ("SEPP"), which may perform some or all of the functions discussed above. External device 1954 may, in some situations, subscribe to particular types of requested information provided by the one or more core network elements, and the one or more core network elements may provide (e.g., "push") the requested information to NEF/SCEF 1949 (e.g., in a periodic or otherwise ongoing basis).

In some embodiments, external devices 1954 may communicate with one or more elements of RAN 1910 and/or 1912 via an API or other suitable interface. For example, a given external device 1954 may provide instructions, requests, etc. to RAN 1910 and/or 1912 to provide one or more services via one or more respective MECs 1914. In some embodiments, such instructions, requests, etc. may include QoS parameters, SLAs, etc. (e.g., maximum latency thresholds, minimum throughput thresholds, etc.) associated with the services.

Figure 20:
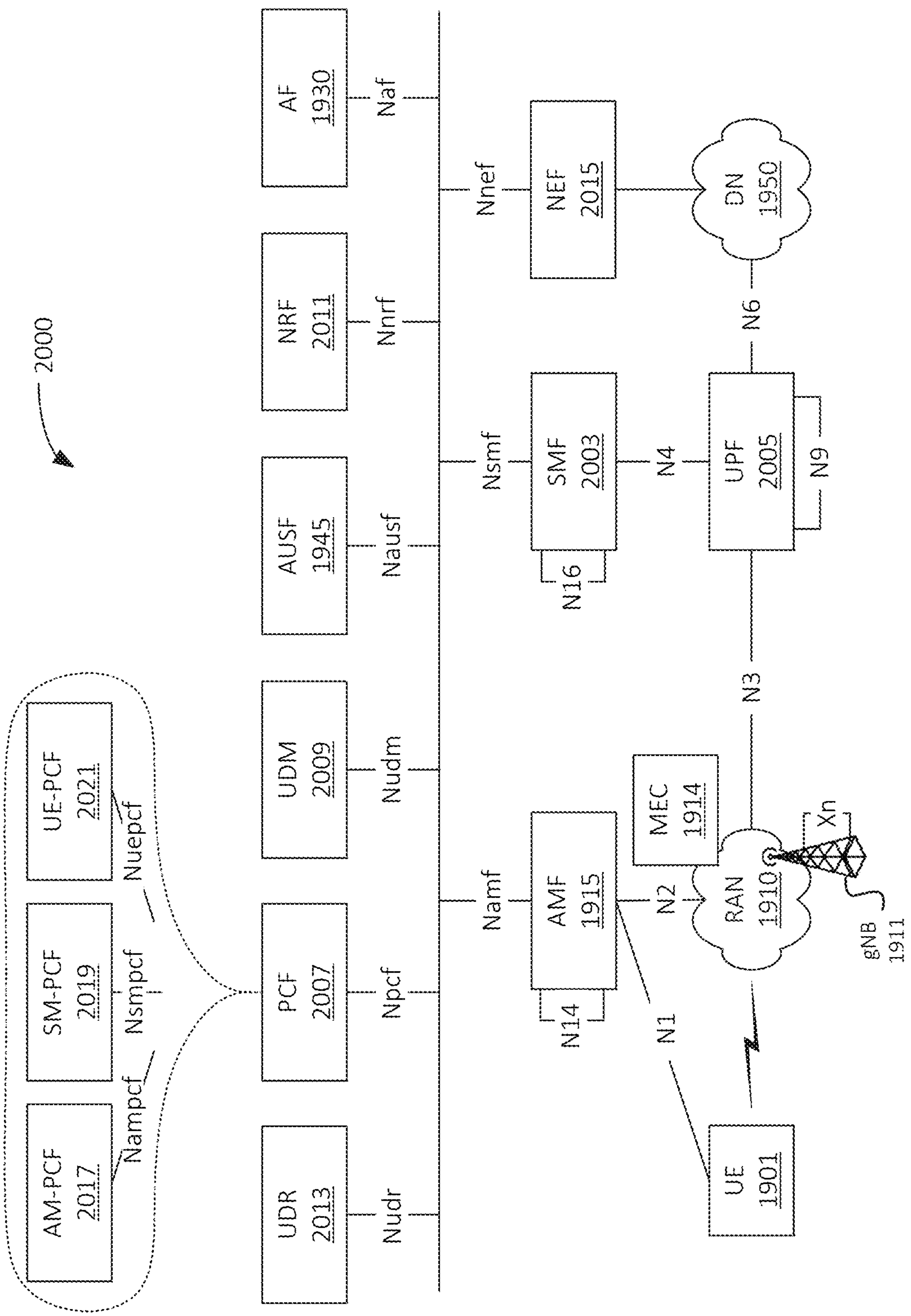

FIG. 20 illustrates another example environment 2000, in which one or more embodiments may be implemented. In some embodiments, environment 2000 may correspond to a 5G network, and/or may include elements of a 5G network. In some embodiments, environment 2000 may correspond to a 5G SA architecture. In some embodiments, environment 2000 may include a 5GC, in which 5GC network elements perform one or more operations described herein.

As shown, environment 2000 may include UE 1901, RAN 1910 (which may include one or more gNBs 1911 or other types of wireless network infrastructure) and various network functions, which may be implemented as VNFs, CNFs, etc. Such network functions may include AMF 1915, SMF 2003, UPF 2005, PCF 2007, UDM 2009, AUSF 1945, Network Repository Function ("NRF") 2011, AF 1930, UDR 2013, and NEF 2015. Environment 2000 may also include or may be communicatively coupled to one or more networks, such as DN 1950.

The example shown in FIG. 20 illustrates one instance of each network component or function (e.g., one instance of SMF 2003, UPF 2005, PCF 2007, UDM 2009, AUSF 1945, etc.). In practice, environment 2000 may include multiple instances of such components or functions. For example, in some embodiments, environment 2000 may include multiple "slices" of a core network, where each slice includes a discrete and/or logical set of network functions (e.g., one slice may include a first instance of SMF 2003, PCF 2007, UPF 2005, etc., while another slice may include a second instance of SMF 2003, PCF 2007, UPF 2005, etc.). Additionally, or alternatively, one or more of the network functions of environment 2000 may implement multiple network slices. The different slices may provide differentiated levels of service, such as service in accordance with different QoS parameters.

The quantity of devices and/or networks, illustrated in FIG. 20, is provided for explanatory purposes only. In practice, environment 2000 may include additional devices and/or networks, fewer devices and/or networks, different devices and/or networks, or differently arranged devices and/or networks than illustrated in FIG. 20. For example, while not shown, environment 2000 may include devices that facilitate or enable communication between various components shown in environment 2000, such as routers, modems, gateways, switches, hubs, etc. In some implementations, one or more devices of environment 2000 may be physically integrated in, and/or may be physically attached to, one or more other devices of environment 2000. Alternatively, or additionally, one or more of the devices of environment 2000 may perform one or more network functions described as being performed by another one or more of the devices of environment 2000.

Elements of environment 2000 may interconnect with each other and/or other devices via wired connections, wireless connections, or a combination of wired and wireless connections. Examples of interfaces or communication pathways between the elements of environment 2000, as shown in FIG. 20, may include interfaces shown in FIG. 20 and/or one or more interfaces not explicitly shown in FIG. 20. These interfaces may include interfaces between specific network functions, such as an N1 interface, an N2 interface, an N3 interface, an N6 interface, an N9 interface, an N14 interface, an N16 interface, and/or one or more other interfaces. In some embodiments, one or more elements of environment 2000 may communicate via a service-based architecture ("SBA"), in which a routing mesh or other suitable routing mechanism may route communications to particular network functions based on interfaces or identifiers associated with such network functions. Such interfaces may include or may be referred to as SBIs, including an Namf interface (e.g., indicating communications to be routed to AMF 1915), an Nudm interface (e.g., indicating communications to be routed to UDM 2009), an Npcf interface, an Nupf interface, an Nnef interface, an Nsmf interface, an Nnrf interface, an Nudr interface, an Naf interface, and/or one or more other SBIs.

UPF 2005 may include one or more devices, systems, VNFs, CNFs, etc., that receive, route, process, and/or forward traffic (e.g., user plane traffic). As discussed above, UPF 2005 may communicate with UE 1901 via one or more communication sessions, such as PDU sessions. Such PDU sessions may be associated with a particular network slice or other suitable QoS parameters, as noted above. UPF 2005 may receive downlink user plane traffic (e.g., voice call traffic, data traffic, etc. destined for UE 1901) from DN 1950, and may forward the downlink user plane traffic toward UE 1901 (e.g., via RAN 1910). In some embodiments, multiple UPFs 2005 may be deployed (e.g., in different geographical locations), and the delivery of content to UE 1901 may be coordinated via the N9 interface. Similarly, U P F 2005 may receive uplink traffic from UE 1901 (e.g., via RAN 1910), and may forward the traffic toward DN 1950. In some embodiments, UPF 2005 may implement, may be implemented by, may be communicatively coupled to, and/or may otherwise be associated with UPF/PGW-U 1935. In some embodiments, UPF 2005 may communicate (e.g., via the N4 interface) with SMF 2003, regarding user plane data processed by UPF 2005 (e.g., to provide analytics or reporting information, to receive policy and/or authorization information, etc.).

PCF 2007 may include one or more devices, systems, VNFs, CNFs, etc., that aggregate, derive, generate, etc. policy information associated with the 5GC and/or UEs 1901 that communicate via the 5GC and/or RAN 1910. PCF 2007 may receive information regarding policies and/or subscriptions from one or more sources, such as subscriber databases (e.g., UDM 2009, UDR 2013, etc.), and/or from one or more users such as, for example, an administrator associated with PCF 2007. In some embodiments, the functionality of PCF 2007 may be split into multiple network functions or subsystems, such as access and mobility PCF ("AM-PCF") 2017, session management PCF ("SM-PCF") 2019, UE PCF ("UE-PCF") 2021, and so on. Such different "split" PCFs may be associated with respective SBIs (e.g., AM-PCF 2017 may be associated with an Nampcf SBI, SM-PCF 2019 may be associated with an Nsmpcf SBI, UE-PCF 2021 may be associated with an Nuepcf SBI, and so on) via which other network functions may communicate with the split PCFs. The split PCFs may maintain information regarding policies associated with different devices, systems, and/or network functions.

NRF 2011 may include one or more devices, systems, VNFs, CNFs, etc. that maintain routing and/or network topology information associated with the 5GC. For example, NRF 2011 may maintain and/or provide IP addresses of one or more network functions, routes associated with one or more network functions, discovery and/or mapping information associated with particular network functions or network function instances (e.g., whereby such discovery and/or mapping information may facilitate the SBA), and/or other suitable information.

UDR 2013 may include one or more devices, systems, VNFs, CNFs, etc. that provide user and/or subscriber information, based on which PCF 2007 and/or other elements of environment 2000 may determine access policies, QoS policies, charging policies, or the like. In some embodiments, UDR 2013 may receive such information from UDM 2009 and/or one or more other sources.

NEF 2015 may include one or more devices, systems, VNFs, CNFs, etc. that provide access to information, APIs, and/or other operations or mechanisms of the 5GC to devices or systems that are external to the 5GC. NEF 2015 may maintain authorization and/or authentication information associated with such external devices or systems, such that NEF 2015 is able to provide information, that is authorized to be provided, to the external devices or systems. Such information may be received from other network functions of the 5GC (e.g., as authorized by an administrator or other suitable entity associated with the 5GC), such as SMF 2003, UPF 2005, a charging function ("CHF") of the 5GC, and/or other suitable network function. NEF 2015 may communicate with external devices or systems (e.g., external devices 1954) via DN 1950 and/or other suitable communication pathways.

While environment 2000 is described in the context of a 5GC, as noted above, environment 2000 may, in some embodiments, include or implement one or more other types of core networks. For example, in some embodiments, environment 2000 may be or may include a converged packet core, in which one or more elements may perform some or all of the functionality of one or more 5GC network functions and/or one or more EPC network functions. For example, in some embodiments, AMF 1915 may include, may implement, may be implemented by, and/or may otherwise be associated with MME 1916; SMF 2003 may include, may implement, may be implemented by, and/or may otherwise be associated with SGW 1917; PCF 2007 may include, may implement, may be implemented by, and/or may otherwise be associated with a PCRF (e.g., PCF/PCRF 1925); NEF 2015 may include, may implement, may be implemented by, and/or may otherwise be associated with a SCEF (e.g., NEF/SCEF 1949); and so on.

Figure 21:
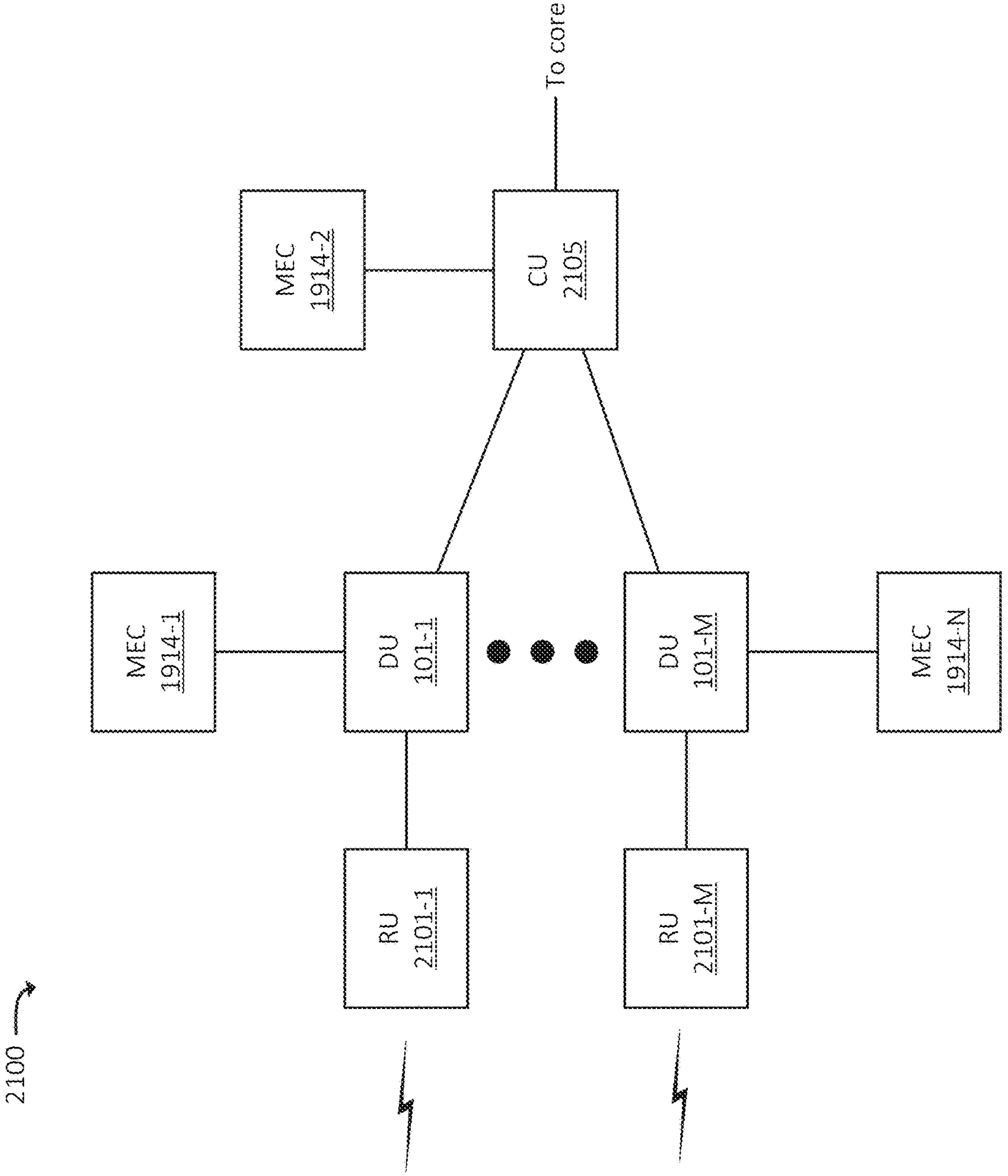
FIG. 21 illustrates an example arrangement of a RAN, in accordance with some embodiments.

FIG. 21 illustrates an example RAN environment 2100, which may be included in and/or implemented by one or more RANs (e.g., RAN 1910 or some other RAN). In some embodiments, a particular RAN 1910 may include one RAN environment 2100. In some embodiments, a particular RAN 1910 may include multiple RAN environments 2100. In some embodiments, RAN environment 2100 may correspond to a particular gNB 1911 of RAN 1910. In some embodiments, RAN environment 2100 may correspond to multiple gNBs 1911. In some embodiments, RAN environment 2100 may correspond to one or more other types of base stations of one or more other types of RANs. As shown, RAN environment 2100 may include CU 2105, one or more DUs 101-1 through 101-M (referred to individually as "DU 101," or collectively as "DUs 101"), and one or more RUs 2101-1 through 2101-M (referred to individually as "RU 2101," or collectively as "RUs 2101").

CU 2105 may communicate with a core of a wireless network (e.g., may communicate with one or more of the devices or systems described above with respect to FIG. 20, such as AMF 1915 and/or UPF 2005) and/or some other device or system such as MEC 1914. In the uplink direction (e.g., for traffic from UEs 1901 to a core network), CU 2105 may aggregate traffic from DUs 101, and forward the aggregated traffic to the core network. In some embodiments, CU 2105 may receive traffic according to a given protocol (e.g., Radio Link Control ("RLC") traffic) from DUs 101, and may perform higher-layer processing (e.g., may aggregate/process RLC packets and generate Packet Data Convergence Protocol ("PDCP") packets based on the RLC packets) on the traffic received from DUs 101.

CU 2105 may receive downlink traffic (e.g., traffic from the core network, traffic from a given MEC 1914, etc.) for a particular UE 1901, and may determine which DU(s) 101 should receive the downlink traffic. DU 101 may include one or more devices that transmit traffic between a core network (e.g., via CU 2105) and UE 1901 (e.g., via a respective RU 2101). DU 101 may, for example, receive traffic from RU 2101 at a first layer (e.g., physical ("PHY") layer traffic, or lower PHY layer traffic), and may process/aggregate the traffic to a second layer (e.g., upper PHY and/or RLC). DU 101 may receive traffic from CU 2105 at the second layer, may process the traffic to the first layer, and provide the processed traffic to a respective RU 2101 for transmission to UE 1901.

RU 2101 may include hardware circuitry (e.g., one or more RF transceivers, antennas, radios, and/or other suitable hardware) to communicate wirelessly (e.g., via an RF interface) with one or more UEs 1901, one or more other DUs 101 (e.g., via RUs 2101 associated with DUs 101), and/or any other suitable type of device. In the uplink direction, RU 2101 may receive traffic from UE 1901 and/or another DU 101 via the RF interface and may provide the traffic to DU 101. In the downlink direction, RU 2101 may receive traffic from DU 101, and may provide the traffic to UE 1901 and/or another DU 101.

One or more elements of RAN environment 2100 may, in some embodiments, be communicatively coupled to one or more MECs 1914. For example, DU 101-1 may be communicatively coupled to MEC 1914-1, DU 101-M may be communicatively coupled to MEC 1914-N, CU 2105 may be communicatively coupled to MEC 1914-2, and so on. MECs 1914 may include hardware resources (e.g., configurable or provisionable hardware resources) that may be configured to provide services and/or otherwise process traffic to and/or from UE 1901, via a respective RU 2101.

For example, DU 101-1 may route some traffic, from UE 1901, to MEC 1914-1 instead of to a core network via CU 2105. MEC 1914-1 may process the traffic, perform one or more computations based on the received traffic, and may provide traffic to UE 1901 via RU 2101-1. As discussed above, MEC 1914 may include, and/or may implement, some or all of the functionality described above with respect to UPF 2005, AF 1930, and/or one or more other devices, systems, VNFs, CNFs, etc. In this manner, ultra-low latency services may be provided to UE 1901, as traffic does not need to traverse DU 101, CU 2105, links between DU 101 and CU 2105, and an intervening backhaul network between RAN environment 2100 and the core network.

Figure 22:
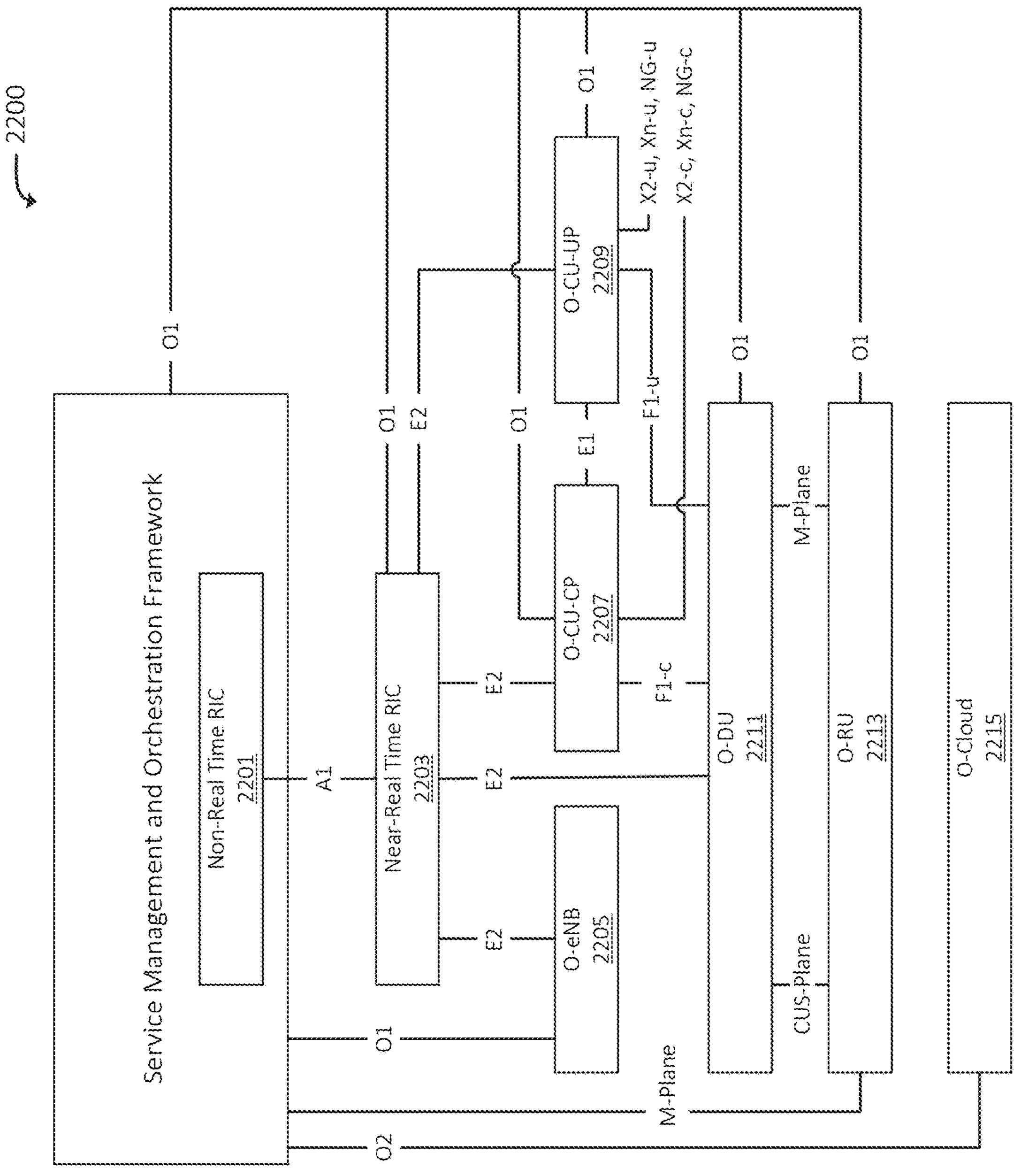
FIG. 22 illustrates an example arrangement of an Open RAN ("O-RAN") environment in which one or more embodiments, described herein, may be implemented.

FIG. 22 illustrates an example O-RAN environment 2200, which may correspond to RAN 1910, RAN 1912, and/or RAN environment 2100. For example, RAN 1910, RAN 1912, and/or RAN environment 2100 may include one or more instances of O-RAN environment 2200, and/or one or more instances of O-RAN environment 2200 may implement RAN 1910, RAN 1912, RAN environment 2100, and/or some portion thereof. As shown, O-RAN environment 2200 may include Non-Real Time Radio Intelligent Controller ("RIC") 2201, Near-Real Time RIC 2203, O-eNB 2205, O-CU-Control Plane ("O-CU-CP") 2207, O-CU-User Plane ("O-CU-UP") 2209, O-DU 2211, O-RU 2213, and O-Cloud 2215. In some embodiments, O-RAN environment 2200 may include additional, fewer, different, and/or differently arranged components or interfaces.

In some embodiments, some or all of the elements of O-RAN environment 2200 may be implemented by one or more configurable or provisionable resources, such as virtual machines, cloud computing systems, physical servers, and/or other types of configurable or provisionable resources. In some embodiments, some or all of O-RAN environment 2200 may be implemented by, and/or communicatively coupled to, one or more MECs 1914.

Non-Real Time RIC 2201 and Near-Real Time RIC 2203 may receive performance information (and/or other types of information) from one or more sources, and may configure other elements of O-RAN environment 2200 based on such performance or other information. For example, Near-Real Time RIC 2203 may receive performance information, via one or more E2 interfaces, from O-eNB 2205, O-CU-CP 2207, and/or O-CU-UP 2209, and may modify parameters associated with O-eNB 2205, O-CU-CP 2207, and/or O-CU-UP 2209 based on such performance information. Similarly, Non-Real Time RIC 2201 may receive performance information associated with O-eNB 2205, O-CU-CP 2207, O-CU-UP 2209, and/or one or more other elements of O-RAN environment 2200 and may utilize machine learning and/or other higher level computing or processing to determine modifications to the configuration of O-eNB 2205, O-CU-CP 2207, O-CU-UP 2209, and/or other elements of O-RAN environment 2200. In some embodiments, Non-Real Time RIC 2201 may generate machine learning models based on performance information associated with O-RAN environment 2200 or other sources, and may provide such models to Near-Real Time RIC 2203 for implementation.

In some embodiments, one or more operations described above with respect to DMS 103 may be performed by Non-Real Time RIC 2201 and/or Near-Real Time RIC 2203. In some embodiments, one or more operations described above with respect to Non-Real Time RIC 2201 and/or Near-Real Time RIC 2203 may be performed by DMS 103.

O-eNB 2205 may perform functions similar to those described above with respect to gNB 1911 and/or eNB 1913. For example, O-eNB 2205 may facilitate wireless communications between UE 1901 and a core network. O-CU-CP 2207 may perform control plane signaling to coordinate the aggregation and/or distribution of traffic via one or more DUs 101, which may include and/or be implemented by one or more O-DUs 2211, and O-CU-UP 2209 may perform the aggregation and/or distribution of traffic via such DUs 101 (e.g., O-DUs 2211). O-DU 2211 may be communicatively coupled to one or more RUs 2101, which may include and/or may be implemented by one or more O-RUs 2213. In some embodiments, O-Cloud 2215 may include or be implemented by one or more MECs 1914, which may provide services, and may be communicatively coupled, to O-CU-CP 2207, O-CU-UP 2209, O-DU 2211, and/or O-RU 2213 (e.g., via an O1 and/or O2 interface).

Figure 23:
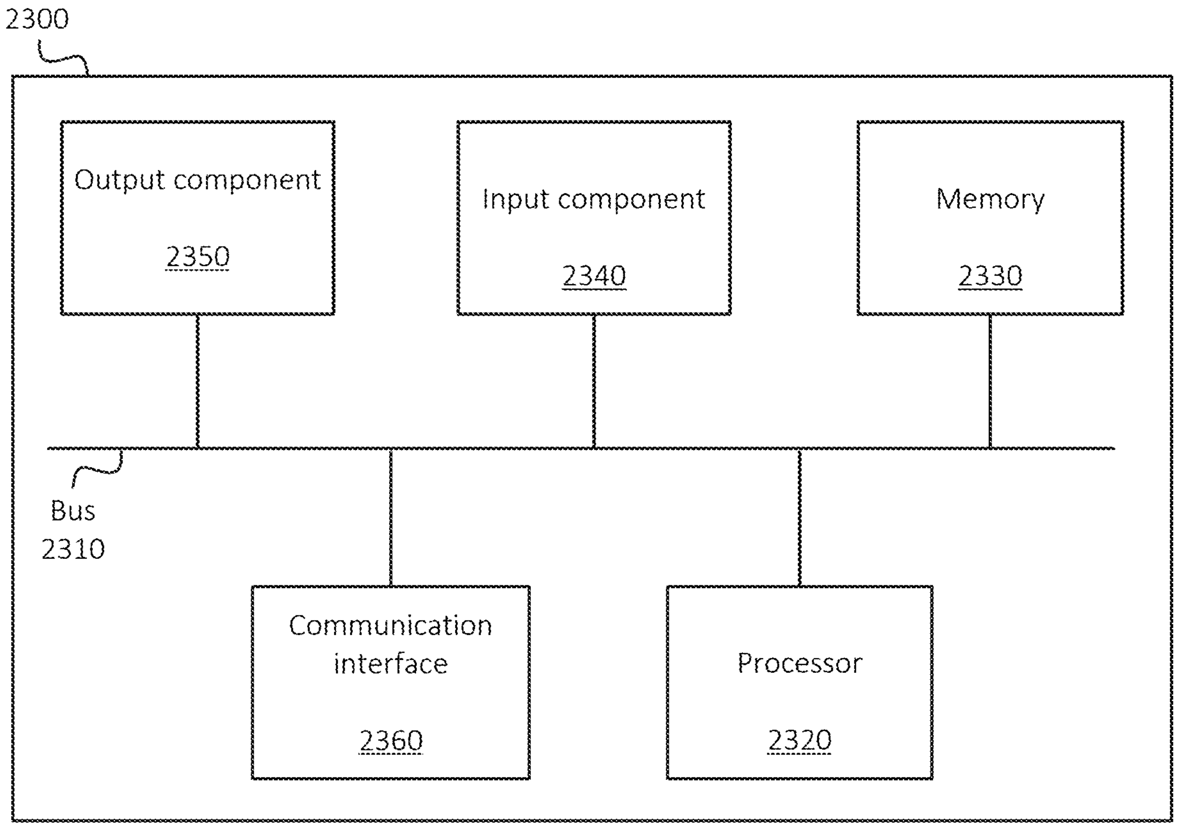
FIG. 23 illustrates example components of one or more devices, in accordance with one or more embodiments described herein.

FIG. 23 illustrates example components of device 2300. One or more of the devices described above may include one or more devices 2300. Device 2300 may include bus 2310, processor 2320, memory 2330, input component 2340, output component 2350, and communication interface 2360. In another implementation, device 2300 may include additional, fewer, different, or differently arranged components.

Bus 2310 may include one or more communication paths that permit communication among the components of device 2300. Processor 2320 may include a processor, microprocessor, a set of provisioned hardware resources of a cloud computing system, or other suitable type of hardware that interprets and/or executes instructions (e.g., processor-executable instructions). In some embodiments, processor 2320 may be or may include one or more hardware processors. Memory 2330 may include any type of dynamic storage device that may store information and instructions for execution by processor 2320, and/or any type of non-volatile storage device that may store information for use by processor 2320.

Input component 2340 may include a mechanism that permits an operator to input information to device 2300 and/or otherwise receives or detects input from a source external to input component 2340, such as a touchpad, a touchscreen, a keyboard, a keypad, a button, a switch, a microphone or other audio input component, etc. In some embodiments, input component 2340 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 2350 may include a mechanism that outputs information to the operator, such as a display, a speaker, one or more light emitting diodes ("LEDs"), etc.

Communication interface 2360 may include any transceiver-like mechanism that enables device 2300 to communicate with other devices and/or systems (e.g., via RAN 1910, RAN 1912, DN 1950, etc.). For example, communication interface 2360 may include an Ethernet interface, an optical interface, a coaxial interface, or the like. Communication interface 2360 may include a wireless communication device, such as an infrared ("IR") receiver, a Bluetooth® radio, or the like. The wireless communication device may be coupled to an external device, such as a cellular radio, a remote control, a wireless keyboard, a mobile telephone, etc. In some embodiments, device 2300 may include more than one communication interface 2360. For instance, device 2300 may include an optical interface, a wireless interface, an Ethernet interface, and/or one or more other interfaces.

Device 2300 may perform certain operations relating to one or more processes described above. Device 2300 may perform these operations in response to processor 2320 executing instructions, such as software instructions, processor-executable instructions, etc. stored in a computer-readable medium, such as memory 2330. A computer-readable medium may be defined as a non-transitory memory device. A memory device may include space within a single physical memory device or spread across multiple physical memory devices. The instructions may be read into memory 2330 from another computer-readable medium or from another device. The instructions stored in memory 2330 may be processor-executable instructions that cause processor 2320 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-18), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:

one or more processors configured to:

identify a plurality of configurable parameters associated with a plurality of Network Functions ("NFs") of a wireless network;

identify a link between a first parameter, associated with a first NF of the plurality of NFs, and a second parameter associated with a second NF of the plurality of NFs;

output, to the first NF, an indication of the link between the first parameter associated with the first NF and the second parameter associated with the second NF;

output a first configuration update to the first NF, wherein the first configuration update includes a first value for the first parameter associated with the first NF, wherein the first NF applies the first configuration update and further outputs, to the second NF based on the indicated link between the first parameter associated with the first NF and the second parameter associated with the second NF, the first configuration update to the second NF, wherein the second NF receives the first configuration update from the first NF and modifies, based on receiving the first configuration update, the second parameter based on the first value; and output a second configuration update to the first NF, wherein the second configuration update includes a second value for a third parameter associated with the first NF, wherein the first NF applies the second configuration update without outputting the second configuration update to the second NF.

2. The device of claim 1, wherein the one or more processors are further configured to:

provide granular routing configuration information to the first NF, wherein the granular routing configuration information indicates that the first NF should provide updated values, for the first parameter, to the second NF when the first parameter is modified, wherein the second NF receives the first configuration update based on the first NF identifying that the granular routing configuration information indicates that the first NF should provide updated values, for the first parameter, to the second NF when the first parameter is modified.

3. The device of claim 1, wherein the one or more processors are further configured to:

provide granular routing configuration information to the second NF, wherein the granular routing configuration information indicates that the second NF should request, on an ongoing basis, updated values, for the first parameter, from the first NF, wherein the second NF receives the first configuration update based on the first NF identifying, in response to a request from the second NF, that the first parameter has been updated with the first value.

4. The device of claim 1, wherein the plurality of NFs include a plurality of instances of a same particular type of NF.

5. The device of claim 4, wherein the plurality of instances of the same particular type of NF include a plurality of instances of a Distributed Unit ("DU") of a radio access network ("RAN") of the wireless network.

6. The device of claim 1, wherein the third parameter is not associated with a link between the third parameter and any parameters associated with the second NF, wherein the second NF does not receive an indication of the second configuration update, based on the third parameter not being associated with a link between the third parameter and any parameters associated with the second NF.

7. The device of claim 1, wherein the link between the first parameter and the second parameter includes at least one of:

an identifier of the first NF, an identifier of the second NF, or an identifier associated with the first parameter associated with the first NF.

8. A non-transitory computer-readable medium, storing a plurality of processor-executable instructions to:

identify a plurality of configurable parameters associated with a plurality of Network Functions ("NFs") of a wireless network;

identify a link between a first parameter, associated with a first NF of the plurality of NFs, and a second parameter associated with a second NF of the plurality of NFs;

output, to the first NF, an indication of the link between the first parameter associated with the first NF and the second parameter associated with the second NF;

output a first configuration update to the first NF, wherein the first configuration update includes a first value for the first parameter associated with the first NF, wherein the first NF applies the first configuration update and further outputs, to the second NF based on the indicated link between the first parameter associated with the first NF and the second parameter associated with the second NE, the first configuration update to the second NF, wherein the second NF receives the first configuration update from the first NF and modifies, based on receiving the first configuration update, the second parameter based on the first value; and output a second configuration update to the first NF, wherein the second configuration update includes a second value for a third parameter associated with the first NE, wherein the first NF applies the second configuration update without outputting the second configuration update to the second NF.

9. The non-transitory computer-readable medium of claim 8, wherein the plurality of processor-executable instructions further include processor-executable instructions to:

provide granular routing configuration information to the first NF, wherein the granular routing configuration information indicates that the first NF should provide updated values, for the first parameter, to the second NF when the first parameter is modified, wherein the second NF receives the first configuration update based on the first NF identifying that the granular routing configuration information indicates that the first NF should provide updated values, for the first parameter, to the second NF when the first parameter is modified.

10. The non-transitory computer-readable medium of claim 8, wherein the plurality of processor-executable instructions further include processor-executable instructions to:

provide granular routing configuration information to the second NF, wherein the granular routing configuration information indicates that the second NF should request, on an ongoing basis, updated values, for the first parameter, from the first NF, wherein the second NF receives the first configuration update based on the first NF identifying, in response to a request from the second NF, that the first parameter has been updated with the first value.

11. The non-transitory computer-readable medium of claim 8, wherein the plurality of NFs include a plurality of instances of a same particular type of NF.

12. The non-transitory computer-readable medium of claim 11, wherein the plurality of instances of the same particular type of NF include a plurality of instances of a Distributed Unit ("DU") of a radio access network ("RAN") of the wireless network.

13. The non-transitory computer-readable medium of claim 8, wherein the third parameter is not associated with a link between the third parameter and any parameters associated with the second NF, wherein the second NF does not receive an indication of the second configuration update, based on the third parameter not being associated with a link between the third parameter and any parameters associated with the second NF.

14. The non-transitory computer-readable medium of claim 8, wherein the link between the first parameter and the second parameter includes at least one of:

an identifier of the first NF, an identifier of the second NF, or an identifier associated with the first parameter associated with the first NF.

15. A method, comprising:

identifying a plurality of configurable parameters associated with a plurality of Network Functions ("NFs") of a wireless network;

identifying a link between a first parameter, associated with a first NF of the plurality of NFs, and a second parameter associated with a second NF of the plurality of NFs;

outputting, to the first NF, an indication of the link between the first parameter associated with the first NF and the second parameter associated with the second NF;

outputting a first configuration update to the first NF, wherein the first configuration update includes a first value for the first parameter associated with the first NF, wherein the first NF applies the first configuration update and further outputs, to the second NF based on the indicated link between the first parameter associated with the first NF and the second parameter associated with the second NF, the first configuration update to the second NF, wherein the second NF receives the first configuration update from the first NF and modifies, based on receiving the first configuration update, the second parameter based on the first value; and outputting a second configuration update to the first NF, wherein the second configuration update includes a second value for a third parameter associated with the first NE, wherein the first NF applies the second configuration update without outputting the second configuration update to the second NF.

16. The method of claim 15, further comprising:

providing granular routing configuration information to the first NF, wherein the granular routing configuration information indicates that the first NF should provide updated values, for the first parameter, to the second NF when the first parameter is modified, wherein the second NF receives the first configuration update based on the first NF identifying that the granular routing configuration information indicates that the first NF should provide updated values, for the first parameter, to the second NF when the first parameter is modified.

17. The method of claim 15, further comprising:

providing granular routing configuration information to the second NF, wherein the granular routing configuration information indicates that the second NF should request, on an ongoing basis, updated values, for the first parameter, from the first NF, wherein the second NF receives the first configuration update based on the first NF identifying, in response to a request from the second NF, that the first parameter has been updated with the first value.

18. The method of claim 15, wherein the plurality of NFs include a plurality of Distributed Units ("DUs") of a radio access network ("RAN") of the wireless network.

19. The method of claim 15, wherein the third parameter is not associated with a link between the third parameter and any parameters associated with the second NF, wherein the second NF does not receive an indication of the second configuration update, based on the third parameter not being associated with a link between the third parameter and any parameters associated with the second NF.

20. The method of claim 15, wherein the link between the first parameter and the second parameter includes at least one of:

an identifier of the first NF, an identifier of the second NF, or an identifier associated with the first parameter associated with the first NF.

* * * * *